(12) United States Patent
Faris et al.

(10) Patent No.: US 6,794,069 B1
(45) Date of Patent: Sep. 21, 2004

(54) FUEL CELL SUPPORT AND ELECTRICAL INTERCONNECTOR

(75) Inventors: Sadeg M. Faris, Pleasantville, NY (US); Tsepin Tsai, Chappaqua, NY (US); Wenbin Yao, Fort Lee, NJ (US); Lin-Feng Li, Croton-on-Hudson, NY (US); George Tzong-Chyi Tzeng, Elmsford, NY (US); Michael Rabin, Tarrytown, NY (US); William Morris, Yonkers, NY (US)

(73) Assignee: Reveo, Inc., Elmsford, NY (US)

( * ) Notice: Subject to any disclaimer, the term of this patent is extended or adjusted under 35 U.S.C. 154(b) by 0 days.

(21) Appl. No.: 09/689,318

(22) Filed: Oct. 12, 2000

Related U.S. Application Data

(63) Continuation-in-part of application No. 09/416,554, filed on Oct. 12, 1999.

(51) Int. Cl.[7] .............................................. H01M 8/04
(52) U.S. Cl. ............................ 429/17; 429/9; 429/123; 429/152
(58) Field of Search ............................. 429/9, 17, 123, 429/152, 18, 27

(56) References Cited

U.S. PATENT DOCUMENTS

| | | |
|---|---|---|
| 1,176,488 A | 1/1916 | Leesona |
| 3,252,838 A | 5/1966 | Huber et al. |
| 3,260,620 A | 7/1966 | Gruber |
| 3,357,864 A | 12/1967 | Huber |
| 3,432,354 A | 3/1969 | Jost |
| 3,436,270 A | 4/1969 | Oswin et al. |
| 3,454,429 A | 7/1969 | Gruber ........................ 136/86 |
| 3,532,548 A | 10/1970 | Stachurski |
| 3,536,535 A | 10/1970 | Lippincott |

(List continued on next page.)

OTHER PUBLICATIONS

Convert 3V To 5V Without Inductors by , Maxim Integrated Products; http://www.maxim–ic.com, vol. 92, 2000, p. 1–3.
Derive 5V From Four AA Cells by, Maxim Integrated Products; http://www.maxim–ic.com, vol. 128, 2000, p. 1–2.

(List continued on next page.)

*Primary Examiner*—Dah-Wei Yuan
(74) *Attorney, Agent, or Firm*—Thomas J. Perkowski, Esq., P.C.; Ralph J. Crispino

(57) ABSTRACT

Fuel cells (e.g., air-depolarized fuel cells) are stacked, supported and electrically interconnected into a battery structure with a connector block. The anode and cathode elements of each fuel cell are provided with conductive terminating elements (e.g., plug connectors), preferably extending in downward "U" shaped configuration from the upper ends of the anode and cathode elements respectively. The connector block comprises a series of conductive apertures, positioned and sized, to accommodate the conductive terminating elements of the anodes and cathodes therein. When the conductive terminating elements of the anodes and cathodes are slidably engaged with the conductive apertures of the connector block, the connector block mechanical support the anodes and cathode so engaged. The connector block preferably comprises a electrically conductive elements to electrically connect the anodes and cathodes of the stacked cells in a desired electrical interconnection (serial, parallel and mixed serial and parallel segments). The interconnection between terminal conductor elements and the respective apertures further serves to support and orient the cells in a minimal volume and permits selective rapid cell removal for replacement or servicing. The cells are also provided with keyed members for keyed interlocking with a support tray having co-fitting keying elements to provide full structural integrity for the stacked cells. Lateral end elements extend between the connector block and support tray to complete an open enclosure and provide a support base for air circulating devices such as fans. Air is circulated through a duct defined by the connector block.

119 Claims, 13 Drawing Sheets

U.S. PATENT DOCUMENTS

| | | |
|---|---|---|
| 3,577,281 A | 5/1971 | Pountney et al. |
| 3,663,298 A | 5/1972 | McCoy et al. |
| 3,717,505 A | 2/1973 | Unkle, Jr. et al. |
| 3,822,149 A | 7/1974 | Hale |
| 3,845,835 A | 11/1974 | Petit |
| 3,909,685 A | 9/1975 | Baker et al. |
| 3,928,072 A | 12/1975 | Gerbler et al. |
| 3,963,519 A | 6/1976 | Louie |
| 3,977,901 A | 8/1976 | Buzzelli |
| 4,052,541 A | 10/1977 | von Krusenstierna |
| 4,152,489 A | 5/1979 | Chottiner |
| 4,172,924 A | 10/1979 | Warszawski |
| 4,246,324 A | 1/1981 | de Nora et al. |
| 4,331,742 A | 5/1982 | Lovelace et al. |
| 4,341,847 A | 7/1982 | Sammells |
| 4,551,399 A | 11/1985 | Despic |
| 4,560,626 A | 12/1985 | Joy |
| 4,626,482 A | 12/1986 | Hamlen et al. |
| 4,689,531 A | 8/1987 | Bacon |
| 4,693,946 A | 9/1987 | Niksa et al. |
| 4,714,662 A | 12/1987 | Bennett |
| 4,828,939 A | 5/1989 | Turley et al. |
| 4,913,983 A | 4/1990 | Cheiky |
| 4,916,036 A | 4/1990 | Cheiky |
| 4,950,561 A | 8/1990 | Niksa et al. |
| 4,957,826 A | 9/1990 | Cheiky |
| 4,968,396 A | 11/1990 | Harvey |
| 5,121,044 A | 6/1992 | Goldman |
| 5,185,218 A | 2/1993 | Brokman et al. |
| 5,190,833 A | 3/1993 | Goldstein et al. |
| 5,196,275 A | 3/1993 | Goldman et al. |
| 5,242,765 A | 9/1993 | Naimer et al. |
| 5,250,370 A | 10/1993 | Faris |
| 5,260,144 A | 11/1993 | O'Callaghan |
| 5,306,579 A | 4/1994 | Shepard, Jr. et al. |
| 5,312,701 A | 5/1994 | Khasin et al. |
| 5,318,861 A | 6/1994 | Harats et al. |
| 5,328,777 A | 7/1994 | Bentz |
| 5,328,778 A | 7/1994 | Woodruff |
| 5,354,625 A | 10/1994 | Bentz et al. |
| 5,360,680 A | 11/1994 | Goldman et al. |
| 5,362,577 A | 11/1994 | Pedicini |
| 5,366,822 A | 11/1994 | Korall et al. |
| 5,387,477 A | 2/1995 | Cheiky |
| 5,389,456 A | 2/1995 | Singh et al. |
| 5,405,713 A | 4/1995 | Pecherer et al. |
| 5,411,592 A | 5/1995 | Ovshinsky et al. |
| 5,415,949 A * | 5/1995 | Stone et al. .................. 429/22 |
| 5,418,080 A | 5/1995 | Korall et al. |
| 5,439,758 A | 8/1995 | Stone et al. |
| 5,447,805 A | 9/1995 | Harats et al. |
| 5,462,816 A | 10/1995 | Okamura et al. |
| 5,486,429 A | 1/1996 | Thibault |
| 5,512,384 A | 4/1996 | Celeste et al. |
| 5,525,441 A | 6/1996 | Reddy et al. |
| 5,532,086 A | 7/1996 | Thibault et al. |
| 5,536,592 A | 7/1996 | Celeste et al. |
| 5,554,452 A | 9/1996 | Delmolino et al. |
| 5,569,551 A | 10/1996 | Pedicini et al. |
| 5,582,931 A | 12/1996 | Kawahami |
| 5,599,637 A | 2/1997 | Pecherer et al. |
| 5,691,074 A | 11/1997 | Pedicini |
| 5,711,648 A | 1/1998 | Hammerslag |
| 5,721,064 A | 2/1998 | Pedicini et al. |
| 5,726,551 A | 3/1998 | Miyazaki et al. |
| 5,756,228 A | 5/1998 | Roseanou |
| 5,771,476 A | 6/1998 | Mufford et al. |
| 5,904,999 A | 5/1999 | Kimberg et al. |
| 5,978,283 A | 11/1999 | Hsu et al. |
| 6,057,052 A | 5/2000 | Shrim et al. |

OTHER PUBLICATIONS

Boost/Linear Regulator Derives 5B From Four Cells by , Maxim Integrated Products, http://www.maxim–ic.com, 2000.

Fuel Cell Technology & Applications, http://www.metallicpower.com/rtfuel.htm by , Metallic Power, Inc., 1999.

Fuel Cells And Their Applications by Karl Kordesch and Gunter Simader, VCH Publishers, Inc., New York NY, Chapters 4.8.1–4.8.2, 1996, p. 158–162.

Fabrication of Thin–Film LIMN2O4 Cathodes for Rechargeable Microbatteries by F.K. Shokoohi, et al., Applied Physics Letters, 1991, p. 1260–1262.

New Age EVs by Herb Schuldner, Popular Mechanics, 1991, p. 27–29.

Battery Chargers by Mike Allen, Popular Mechanics, 1991, p. 30–31.

Marketing Study for AER Energy Resources, Inc. by Authors not indicated, AER Energy Resources, Inc., 1991, p. 6–28.

Electric Car Showdown in Phoenix by Rick Cook, Popular Science, 1991, p. 64–65,82.

LBL Researchers Work on New Generation of Batteries by Jeffery Kahn, www.lbl.gov/Science–Articles/Archive/battery–development–at–lbl.html, 1990, p. 1–6.

Batteries for Cordless Appliances by Ralph J. Brodd, Ch. 3 of Batteries for Cordless Appliances, 1987, p. 49–59.

PCT/US98/21257 Search Report, 1998.

PCT/US98/21260 Search Report, 1998.

PCT/US98/21256 Search Report, 1997.

* cited by examiner

FUEL CELL SUPPORT AND ELECTRICAL INTERCONNECTOR

RELATED CASES

This is a Continuation-in-Part of U.S. Application Ser. No. 09/416,554 entitled "Fuel Cell Support And Electrical Interconnector" filed Oct. 12, 1999, commonly assigned to the assignee of the present invention, being incorporated herein in its entirety.

BACKGROUND OF THE INVENTION

1. Field of Invention

This invention relates to fuel cell batteries, and, more particularly, to fuel cell batteries requiring refueling of anode material, replacement of anode structures, replacement of cathode structures, and/or electrolyte maintenance.

2. Description of Related Art

A fuel cell is a device that converts the energy of a fuel (metal hydrogen, natural gas, methanol gasoline, etc.) and an oxidant (air or oxygen) into useable electricity. A fuel cell construction generally consists of a fuel supplying electrode (anode) and an oxidant electrode (cathode) separated by an ion conducting medium. A fuel cell stack is comprised of numerous individual cells stacked together to provide the required power. Unlike traditional fossil plants that combust fuels, fuel cells generate electricity through an electrochemical process from which no particulate matter, nitrogen or sulfur oxides (NOx or SOx) are produced. As a result, they do not contribute to the formation of smog and acid rain.

Metal-air fuel cells convert metal fuel (such as zinc or aluminum) and an oxidant (such as air or oxygen) into electricity. Examples of metal-air fuel cells are described in detail in WO99/19628, entitled "Metal-Air Fuel Cell Battery Systems Employing Metal-Fuel Cards", WO99/18627 entitled "Metal-Air Fuel Cell Battery Systems Employing Metal-Fuel Tape", and WO99/18620 entitled "Metal-Air Fuel Cell Battery Systems Employing Moving Anode And Cathode Structures", U.S. Pat. No. 5,250,370, incorporated herein by reference, and other applied science publications well known in the art.

Hydrogen-based fuel cells convert hydrogen fuel and an oxidant (such as air or oxygen into electricity. An example of a hydrogen-based fuel cell is described in WO 99/60642, entitled "Multi-element Fuel Cell System", published May 5, 1999.

Various means have been used for holding the cells in position relative to each other and for electrically interconnecting the cells. Often these means are unrelated and accordingly there is a substantial volumetric loss, excessive complication of elements and overall weight, as well as difficulty in removing and servicing the individual cells. In addition, such fuel cell battery holding structures typically employ an enclosure to house the cells, which renders the enclosed cells difficult to access, replace, or service.

For fuel cells, ease of service is of particular importance because such cells require servicing and replacement of depleted materials in order to work over an extended period of time. More particularly, such cells may require replacement of anode structures, replacement of fuel, replacement of cathode structures and replenishment of electrolyte (or other ionically-conducting medium).

OBJECT AND SUMMARY OF THE PRESENT INVENTION

It is accordingly an object of the present invention to provide a fuel cell battery device or system with a structure providing integrated fuel cell stacking, mechanical support, and fuel cell electrical interconnection.

It is a further object of the present invention to provide a fuel cell battery device or system which permits quick removal and electrical interconnection of fuel cell elements for service (including replacement of anode structures, replacement of fuel, replacement of cathode structures and replenishment of ionically-conducting medium).

It is yet another object of the present invention to provide a fuel cell battery device or system which includes means for air circulation for use with air depolarized fuel cells.

It is a further object of the present invention to provide a fuel cell battery device or system having a structure that independently and releasably engages each of a plurality of fuel cells to thereby mechanically support the fuel cells so engaged.

It is a further object of the present invention to provide a fuel cell battery device or system having a structure that independently and releasably engages the cathode assemblies and anode assemblies of a plurality of fuel cells to mechanically support the cathode assemblies and anode assemblies so engages, and provide electrical connection to the cathode assemblies and anode assemblies so engaged.

It is a further object of the present invention to provide a fuel cell battery device or system that includes a support structure that independently and releasably engages the cathode assemblies and anode assemblies of a plurality of fuel cells to provide electrical connection to the cathode assemblies and anode assemblies so engaged, and that includes an integrated interconnection means that can configure the plurality of fuel cells into a desired interconnection arrangement.

It is a further object of the present invention to provide a fuel cell battery device or system that includes a support structure that independently and releasably engages a plurality of fuel cells along one side of the fuel cells, leaving the other sides (e.g., the top and far side of a plate-like fuel cell) exposed for the ready replacement of the anode, cathode, or the ionically-conducting medium of the individual fuel cell disposed therein.

Generally the present invention comprises a fuel cell battery structure comprising at least two fuel cells and an electrical connector block. The fuel cells are electrically interconnected into a battery structure via the connector block. Each fuel cell comprises an anode and cathode element and each of the anode and cathode elements of each cell are provided with a terminal a conductor element externally positioned on one side of the respective fuel cells. The connector block comprises a series of conductive elements adapted for electrical and mechanical engagement with the respective terminal conductor elements of the anode and cathode elements of each of the fuel cells on said one side of the respective fuel cells. The connector block further comprises means for electrically connecting the anodes and cathodes of the stacked cells into a desired electrical interconnection. In addition, the block mechanically holds the respective fuel cells on one side of the block, in a fixed position as a result of the mechanical engagement. As a result, another side of each of the fuel cells remains exposed to permit disengagement and removal of the fuel cells from the block.

Generally the present invention comprises means for forming a stack of fuel cells into a unique overall fuel cell (in particular air depolarized cells such as zinc/air cells) or battery system, wherein a single structural element provides means for cell support and slacking and electrical interconnection of the cells into a desired electrical configuration. In addition, the structural element is preferably configured with air duct means to facilitate air circulation to the individual cells, with concomitant increase in discharge rate capability.

In a preferred embodiment of the present invention, flat plate fuel cells and batteries of cells, particularly air-depolarized cells, are stacked and electrically interconnected into a battery system with a connector block and optional support tray. The anode and cathode elements of each cell are provided with terminating elements, preferably extending in a downward "U" shaped configuration from the upper ends of the anode and cathode elements respectively, to provide maximum physical support. However, other extension configurations (e.g., upwardly extending, laterally extending, etc., as well as reversal of the male and female elements) are similarly operable and are included in the present invention.

In a preferred embodiment the connector block comprises a series of conductive apertures, positioned and sized to accommodate the terminal conductor elements of the electrodes therein. The connector block further comprises electrical interconnecting elements to electrically connect the electrodes of the stacked cells in a desired electrical interconnection (serial, parallel and mixed serial and parallel segments). Preferably male and female plug connections, embedded within apertures in the connector block, are used to mate with the anode and cathode terminating elements of the fuel cells, to effect both the electrical interconnection and mechanical support between the cells and the connector block. The interconnection between anode and cathode terminating elements and the respective apertures further serves to support and orient the cells in a minimal volume and permits selective rapid cell removal for replacement or servicing. The cells are also preferably provided with keyed members for keyed interlocking with a support tray having co-fitting keying elements to provide full structural integrity for the stacked cell. Lateral end elements extend the connector block and support tray to complete an open enclosure and provide a support base for air circulating devices, such as fans, in an "air management system" and also support the block in a suspended position suitable for engagement with the individual fuel cells.

BRIEF DESCRIPTION OF THE DRAWINGS

In order to more fully understand the objects and features of the present invention, the following Detailed Description of the Illustrative Embodiments should be read in conjunction with the accompanying Drawings, wherein:

FIG. 8b is a sectioned side view of a bus bar as used in FIG. 8a.

DETAILED DESCRIPTION OF THE ILLUSTRATED EMBODIMENTS OF THE PRESENT INVENTION

Figure 1:
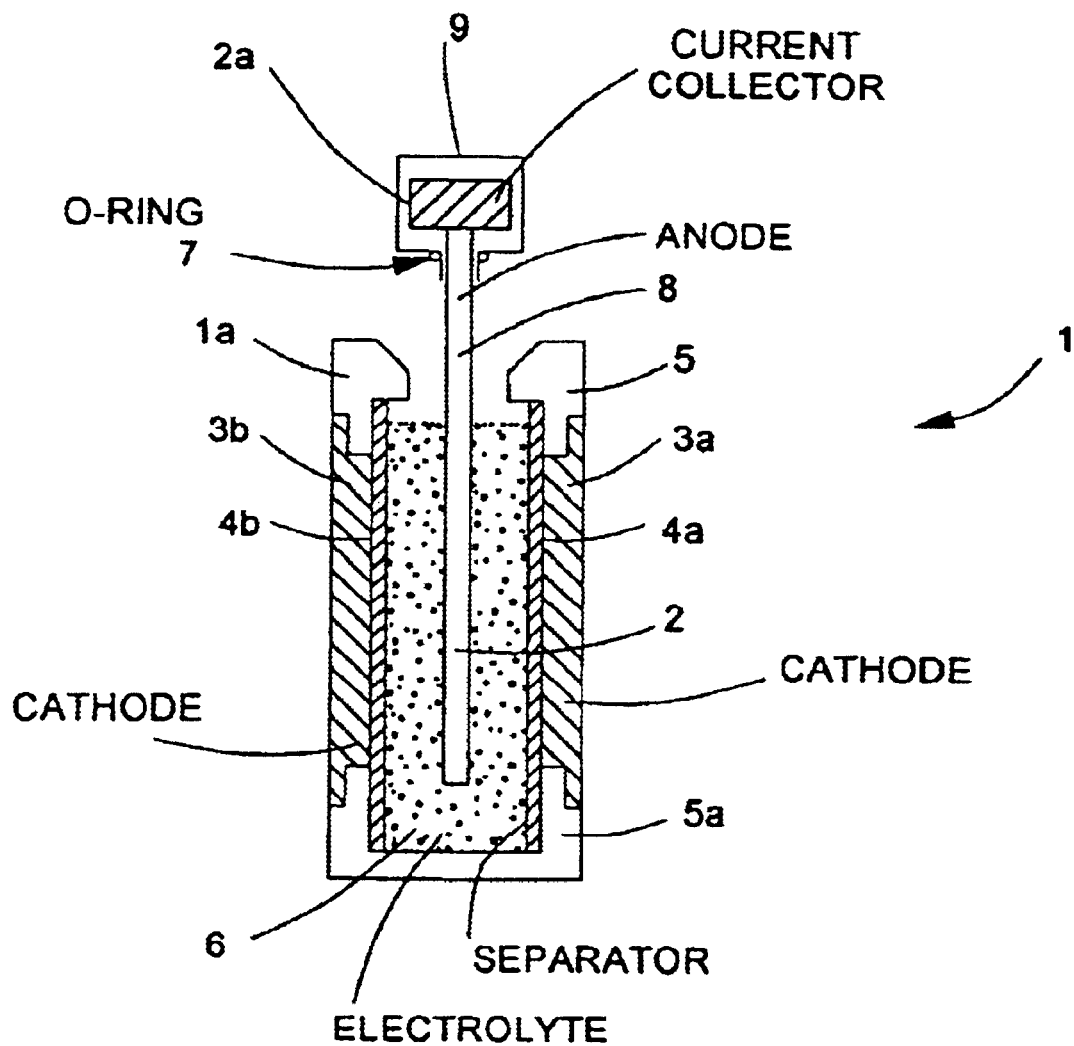
FIG. 1 is a schematic cross section of an exemplary fuel cell (eg., metal-air fuel cell) in which the present invention can be embodied.

Referring now to the figures in the accompanying Drawings, the best modes for carrying out the present invention will now be described in great technical detail, wherein like elements ware indicated by like reference numbers.

In general, fuel cell battery devices and systems according to the present invention include one or more fuel cells wherein a fuel anode is brought into "ionic-contact" with a cathode structure by way of an ionically-conducting medium (such as an ionically-conducting polymer, an electrolyte gel, or a liquid electrolyte such as KOH or NaOH). An electrochemical reaction at this interface produces electrical power that is delivered to an electrical power-consuming load device electrically coupled thereto (via an anode terminating element electrically coupled between the anode and the electrical power-consuming load device and a cathode terminating element electrically coupled between the cathode structure and the electrical power-consuming load device). During this electro-chemical reaction, $O_2$ is typically consumed at the cathode-electrolyte interface of the fuel cell. In metal-air fuel cell battery devices and systems, the fuel anode is a metal (such as zinc or aluminum in the form cards, sheets, tape, paste and the like. In hydrogen-based fuel cells, hydrogen is used as the fuel. An exemplary hydrogen-based fuel cell is described in WO 99/60642, entitled "Multi-element Fuel Cell System", published May 5, 1999.

In metal-air fuel cell battery devices and systems, the oxidized metal (such as zinc-oxide or aluminum-oxide) may be recharged by connecting a power-generating source across the interface whereby the reverse electro-chemical reaction converts the oxidized metal into its original form suitable for reuse in power discharging operations. The electro-chemistry upon which such discharging and recharging operations are based is described in WO99/18628, entitled "Mcal-Air Fuel Cell Battery Systems Employing Metal-Fuel Cards", WO99/18627 entitled "Metal-Air Fuel Cell Battery Systems Employing Metal-Fuel Tape", and WO99/18620 entitled "Metal-Air Fuel Cell Battery Systems Employing Moving Anode And Cathode Structures", U.S. Pat. No. 5,250,370, and other applied science publications well known in the art.

The anode structure (and anode fuel material in metal-air fuel cells) of the fuel cell in such FCB devices and systems has a limited lifetime. After a number of discharge/recharge cycles, a anode replacement operation is required wherein the anode structure (e.g., oxidized s metal in a metal-air fuel cell, or anode element in a hydrogen-based fuel cell) is replaced with a new anode structure.

The cathode structure of the fuel cell in FCB devices and systems also have a limited lifetime. In metal-air FCB devices/systems, the cathode structures comprises an oxygen-permeable mesh of inert conductor and a catalyst for reducing oxygen that diffuses through the mesh into the system. Typically, the operational lifetime of the cathode structure in metal-air FCB devices/Systems exodus beyond that of a single metal-fuel anode (e.g., 10 to 50 times them operational lifetime), and thus it may be used repeatedly after replacing the corresponding anode. When the operational lifetime of the cathode structure ends, it may be cost effective to replace the "spent" cathode structure.

In addition, the ionically-conducting medium (e.g., electrolyte) of the fuel cell in FCB w device/system also has a limited lifetime. After a number of discharge/recharge cycles, a replacement operation is required wherein the consumed ionically-conducting medium (e.g., electrolyte) is replaced with "fresh" ionically-conducing medium for the fuel cell in the FCB device/system According to the present invention, a fuel cell battery device (or system) includes a plurality of distinct fuel cells and a connector block that independently and releasably engages each of the plurality of fuel cells to thereby mechanically support fuel cells that are engaged by the connector block.

In the preferred embodiment of the present invention, the connector block has a plurality of engagement elements (e.g., plug connectors), corresponding to the cathodes and anodes of the plurality of fuel cells that serve two functions. First, the engagement elements independently and releasably engage the corresponding cathodes and anodes to provide mechanical support to the fuel cells that are engaged by the connector block. Second, the engagement elements provide electrical connection to the cathode-terminating element and anode terminating element of the corresponding cathode and anode.

Preferably, the connector block includes an integrated interconnection means, electrically coupled to the cathode terminating elements and anode terminating elements of the plurality of fuel cells, that is used to configure the plurality of fuel cells into a desired interconnection arrangement. Such features shorten the current collection path and reduces loses, thereby enabling high current system designs (e.g., in excess of 25 Amperes).

Moreover, the connector block preferably engages the plurality of fuel cells along one side of the fuel cells, leaving the other sides (e.g., the top and far side of a plate-like fuel cell) exposed for the ready replacement of the anode, cathode, or the ionically-conducting medium of the individual fuel cell disposed therein. Such features provide a compact, lightweight design that has simple, efficient, and user-friendly maintenance operations, suitable for use by consumers in diverse applications.

The connector block is preferably comprised of an electrically insulating material, such as structurally strong engineering plastic (whereby conductive connectors or buses are used to selectively make the appropriate circuits) and is preferably structured in an elongated laterally stepped configuration with a central raised section and peripheral lower sections (for fuel cells of the same dimension it is preferred that the outer sections be on a single plane). In a preferred embodiment, the central section is provided with two rows of apertures wherein each row accommodates anode connectors from fuel cells positioned on either side of the elongated block, and the outer lower sections are provided with single rows of apertures to accommodate connectors from the cathodes of the adjacent cells (it is of course understood that the anode and cathode connections with the block can be reversed without departing from the scope of the invention). Preferably, the anode connectors connected to a given row of apertures are aligned with one another along the row, and the cathode connectors connected to a given row of apertures are aligned with one another along the row, with the respective anode and cathode connectors being offset from each other (differing height relative to the cells and differing extending length (relative to the block) whereby proper connection of anodes and cathodes with the block is assured.

The connector block longitudinally extends for a length at least sufficient to engage the desired number of fuel cells. The height of the block is preferably minimized to be sufficient to mechanically buttress the adjacently held fuel cells while avoiding blocking intercell areas such that air circulation is not hindered in such intercell areas.

In a preferred embodiment, current collecting elements (which preferably extend along the width of the anode and the length of the cathode) are electrically engaged (such as by a conductive threaded engagement) with the respective banana plug connectors. Female conductive sockets are embedded within the connector block and comprise conductive elements which extend to the underside of the block (distal to the engagement with the cells) for selective electrical interconnection.

In a preferred embodiment of the present invention, the connector block is provided with end support members to maintain it in the elevated position for engagement with the collector plugs of the cell electrodes. Moreover, at least one fan is preferably integrated with one or more of these end support members, and is aligned with the longitudinal spacing between the laterally positioned cells. This configuration provides a central air duct for forced guiding of air to the air depolarized cells and then outwardly across the width of the cells. As a result, air is efficiently provided to the individual cells for the air depolarization thereof with high rate capability.

A bottom tray serves to prevent skewing of the cells if they are moved and to ensure proper placement with keyed element engagement between elements of the cells and the tray. The downward U-shaped engagement is preferred in this regard since it readily permits upward disengagement with both the block and the tray in a single motion In a metal-air FCB device/system according to the present invention, a liquid electrolyte (such as a potassium or sodium hydroxide solution) may be used as the ionically-conducting median of the metal-air FCB cells. In such device/systems, a substantially-transparent window in the wall of the fuel cell structure housing the liquid electrolyte is preferably provided to enable visual monitoring of level of the liquid electrolyte for the given fuel cell. Preferably, this substantially treatment window is located in an wall of the metal-air FCB cell such that it remains visible when the fuel cells are arranged in a stacked-structure as described herein.

Figure 2:
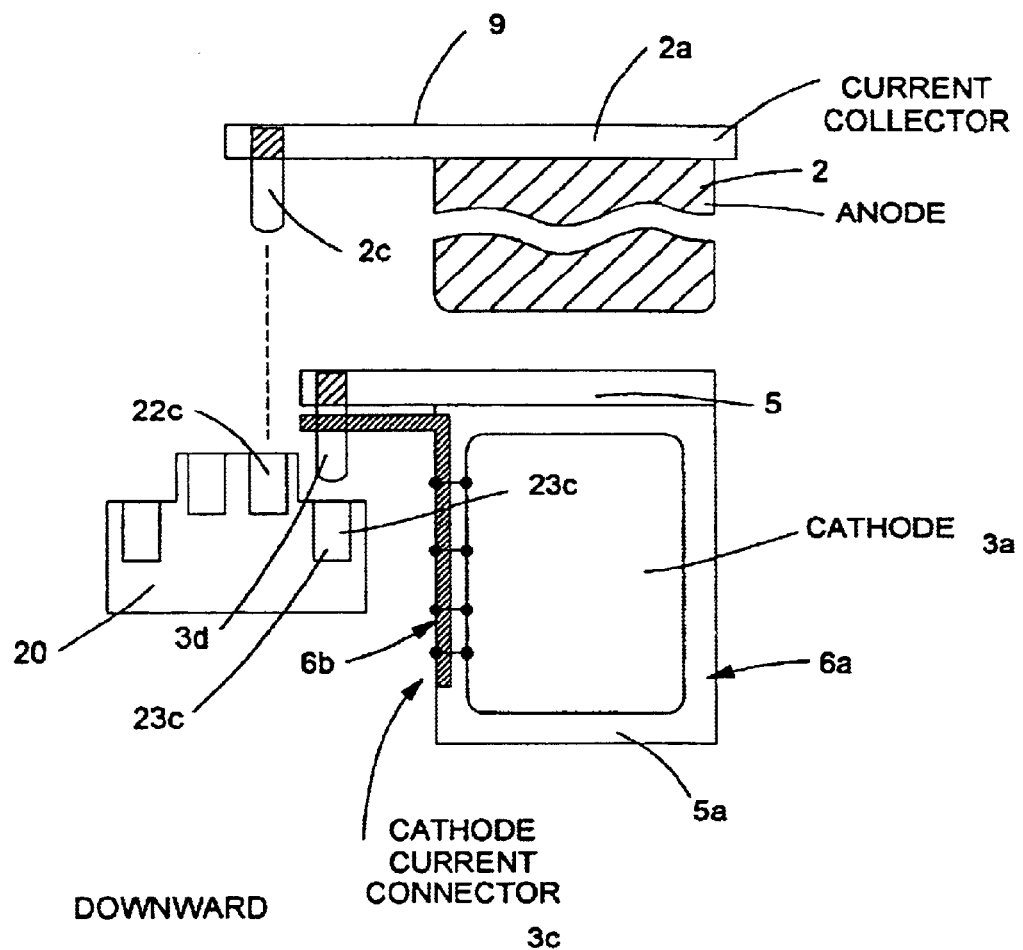
FIG. 2 is an exploded side view of the cell of FIG. 1 shown with respective anode and cathode current collectors and external connective elements relative to a connector block according to an illustrative embodiment of the present invention.
Figure 3:
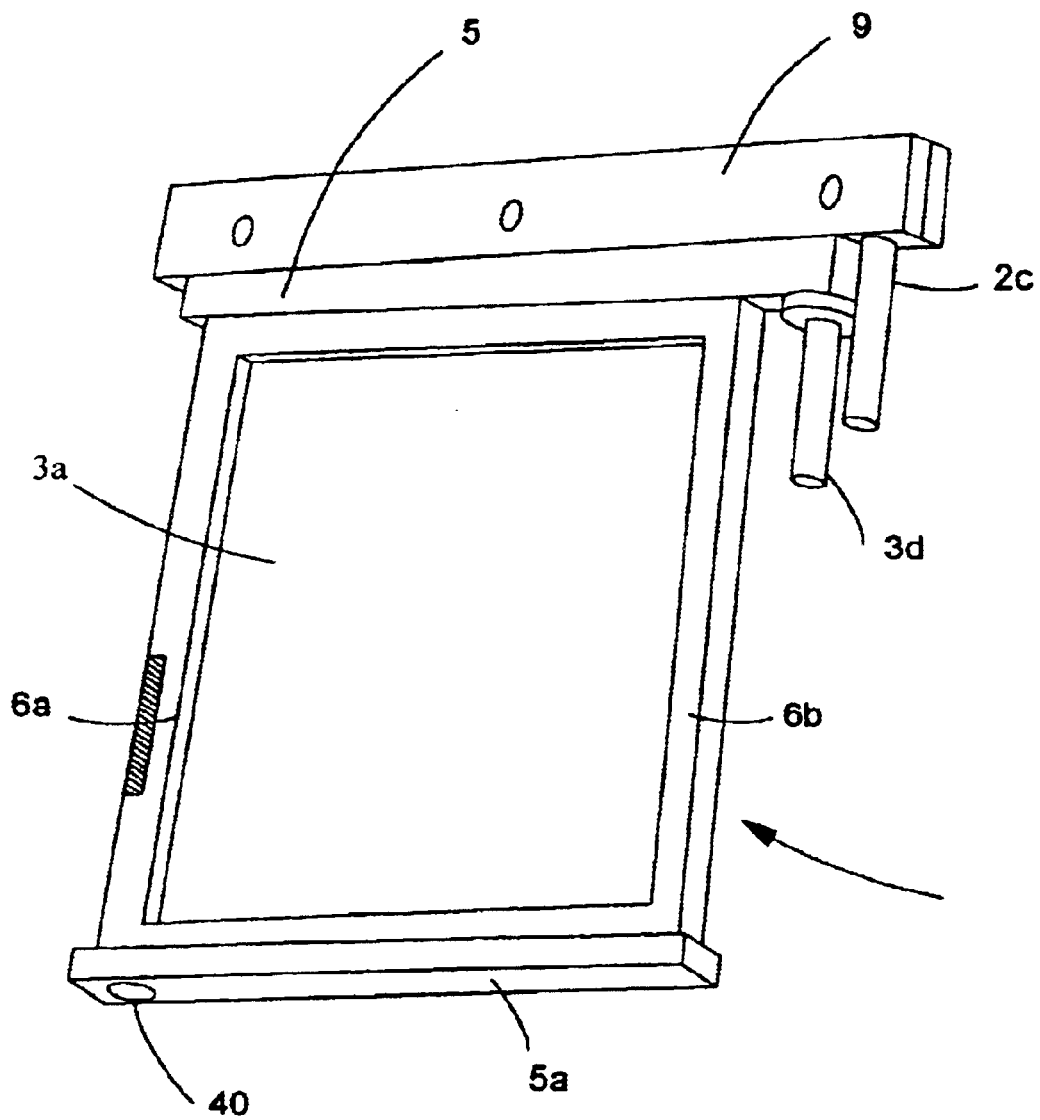
FIG. 3 is an isometric view of the fuel cell of FIGS. 1 and 2 showing the relative positions of anode terminating elements and cathode elements according to an illustrative embodiment of the present invention.

FIG. 1 is a schematic cross-section of an exemplary fuel cell (e.g., plate-like metal-air fuel cell) in which the present invention can be embodied. The fuel cell 1 includes a central anode plate 2 comprising a metal-fuel (such as zinc or aluminum) and a handle 9 having an anode current collector 2a disposed therein. The handle 9 supports an anode terminating element 2c as shown in FIGS. 2 and 3 that terminates the anode current collector 2a. The anode plate 2 is slidably positioned between cathode structures 3a and 3b, which are preferably separated from one another by separators 4a and 4b as shown.

As shown in FIGS. 2 and 3, the cathode structures 3a and 3b serve as two side walls of an enclosure 1a that also includes side walls 6a and 6b, a top wall 5 and an end wall 5a, which are preferably formed from a strong engineering plastic. In addition, the cathode structures 3a and 3b are electrically coupled to a cathode current collector 3c, which is preferably integrated into one of the side walls of the enclosure 1a and which terminates in a cathode terminating element 3d. The top wall 5 of the enclosure 1a supports the cathode terminating element 3d and preferably separates and electrically insulates the respective anode and cathode current collectors.

The anode 2 is slidably inserted into the enclosure 1a through an opening 8 in the top wall 5 of the enclosure 1a. The electrolyte 6 is fully contained within the enclosure 1a and is disposed between the cathode structures 3a and 3b and the anode plate 2 (when inserted into the enclosure 1a). An O-ring 7 provides a seal when the anode plate 2 is properly inserted into the enclosure 1a.

Figure 4:
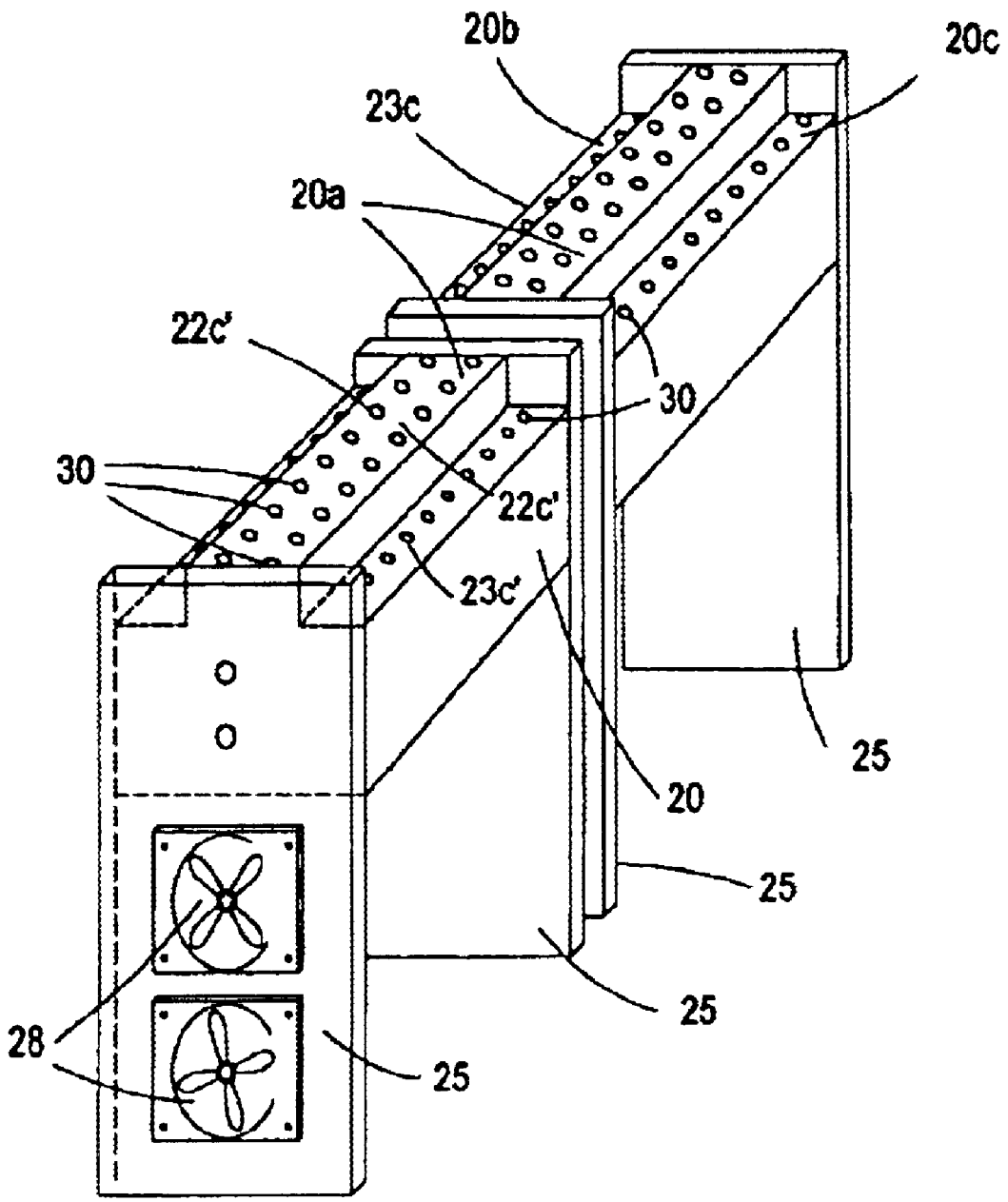
FIG. 4 is an isometric view of two connector blocks of the present invention adjacently aligned, with supporting end elements having air circulation fans according to an illustrative embodiment of the present invention.

FIGS. 2, 3 and 4 are schematic illustrations of an illustrated embodiment of the present invention wherein the exemplary fuel cell of FIG. 1 is releasably engaged by a connector block 20 that serve two functions: First, it provides mechanical support for the fuel cell so engaged, Second, it provides for electrical connection to the cathode terminating elements and anode terminating elements of the fuel cells so engaged.

Figure 10:
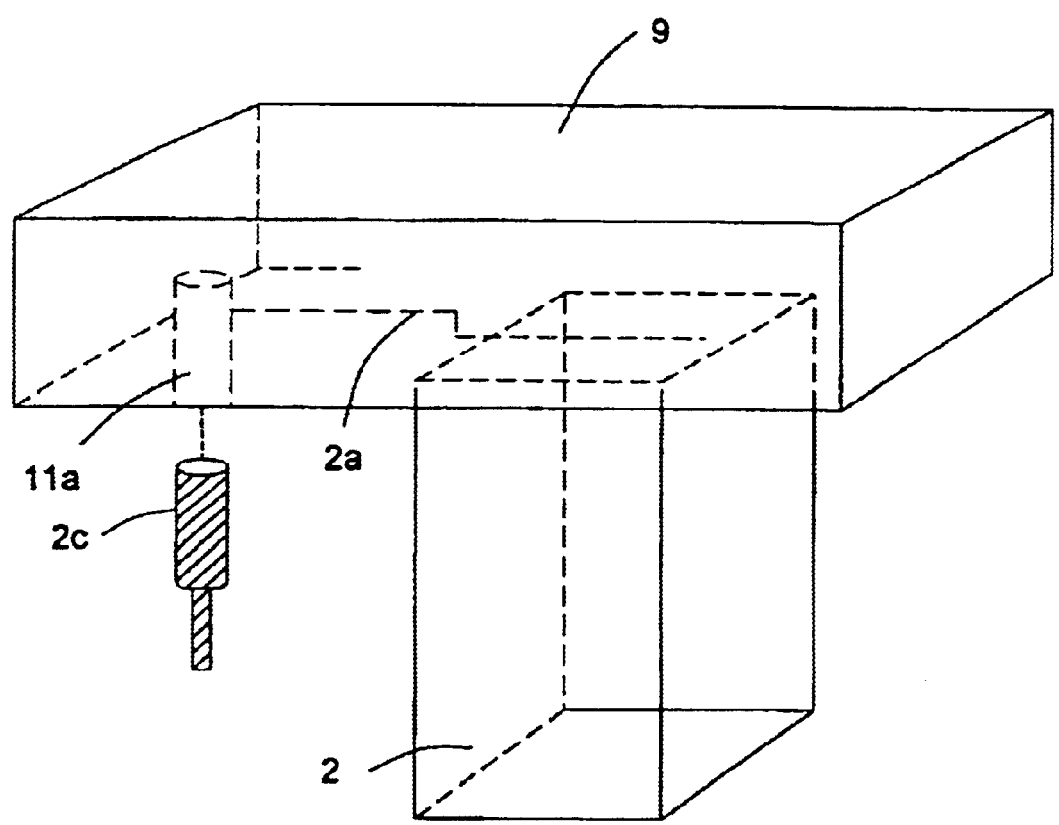
FIG. 10 is a schematic view of an anode assembly with an anode terminating element according to an illustrative embodiment of the present invention.

As shown in FIG. 2, the anode current collector 2a (which preferably extends across the upper width of the handle 9) terminates in downwardly extending anode terminating element 2c (e.g., conductive plug) for insertion into mating aperture 22c in the connector block 20. As shown in FIG. 10, the anode terminating element 2c preferably comprises a plug connector seated into a bore 11a in the handle 9, and electrically coupled to the anode current collector 2a. In such a configuration, the weight of the anode (i.e, the gravitational forces resulting therefrom) is used to maintain the engagement of the anode terminating element 2c into the corresponding mating aperture 22c in the connector block 20.

Figure 11:
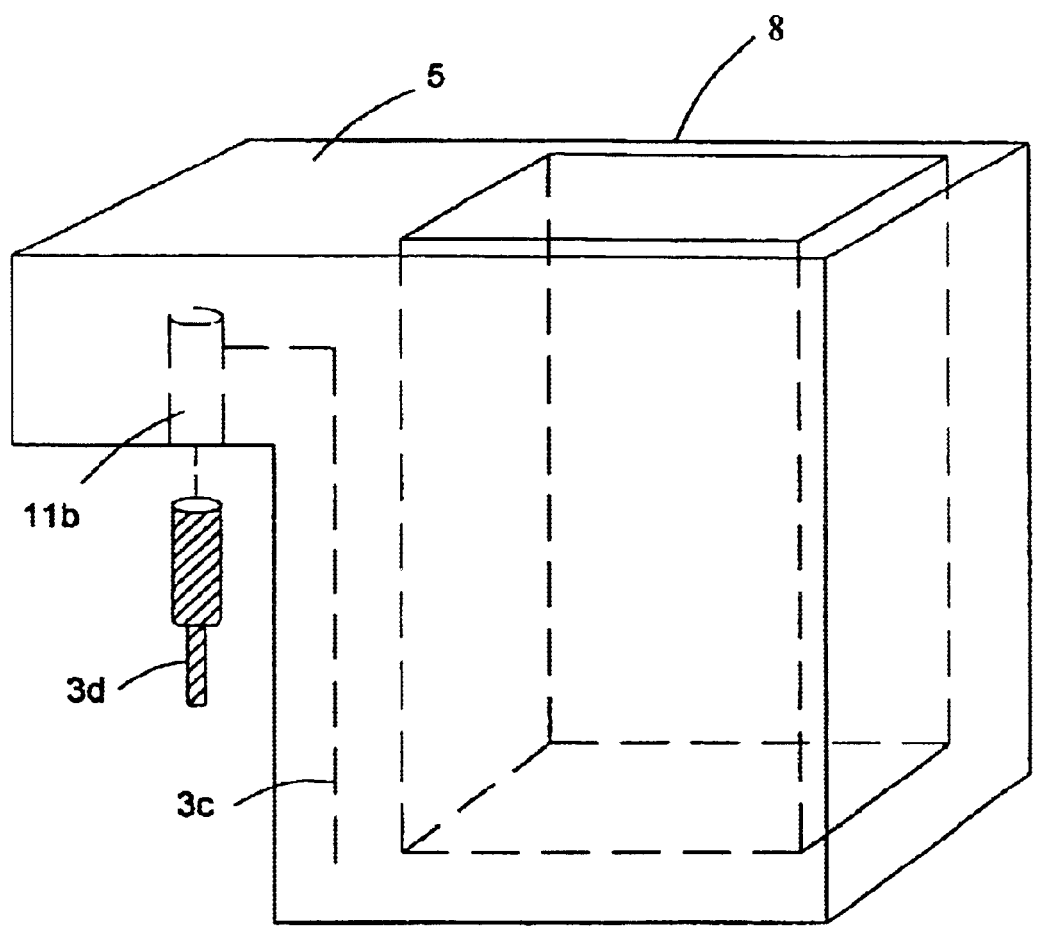
FIG. 11 is a schematic view of a cathode assembly with a cathode terminating element according to an illustrative embodiment of the present invention.

As shown in FIGS. 2 and 3, cathode current collector 3c (which preferably extends along an outer longitudinal edge of the cell as shown) terminates in a downwardly extending cathode terminating element 3d (e.g., conductive plug) for insertion into mating aperture 23c in the connector block 20. As shown in FIG. 11, the cathode terminating element 3d preferably comprises a plug connector seated into a bore 11b in the top wall 5 of the enclosure 1a, and electrically coupled to the cathode current collector 3c. In such a configuration, the weight of the cathode (i.e., the gravitational forces resulting therefrom) is used to maintain the engagement of the cathode terminating element 3d into the corresponding mating aperture 23c in the connector block 20.

Figure 12:
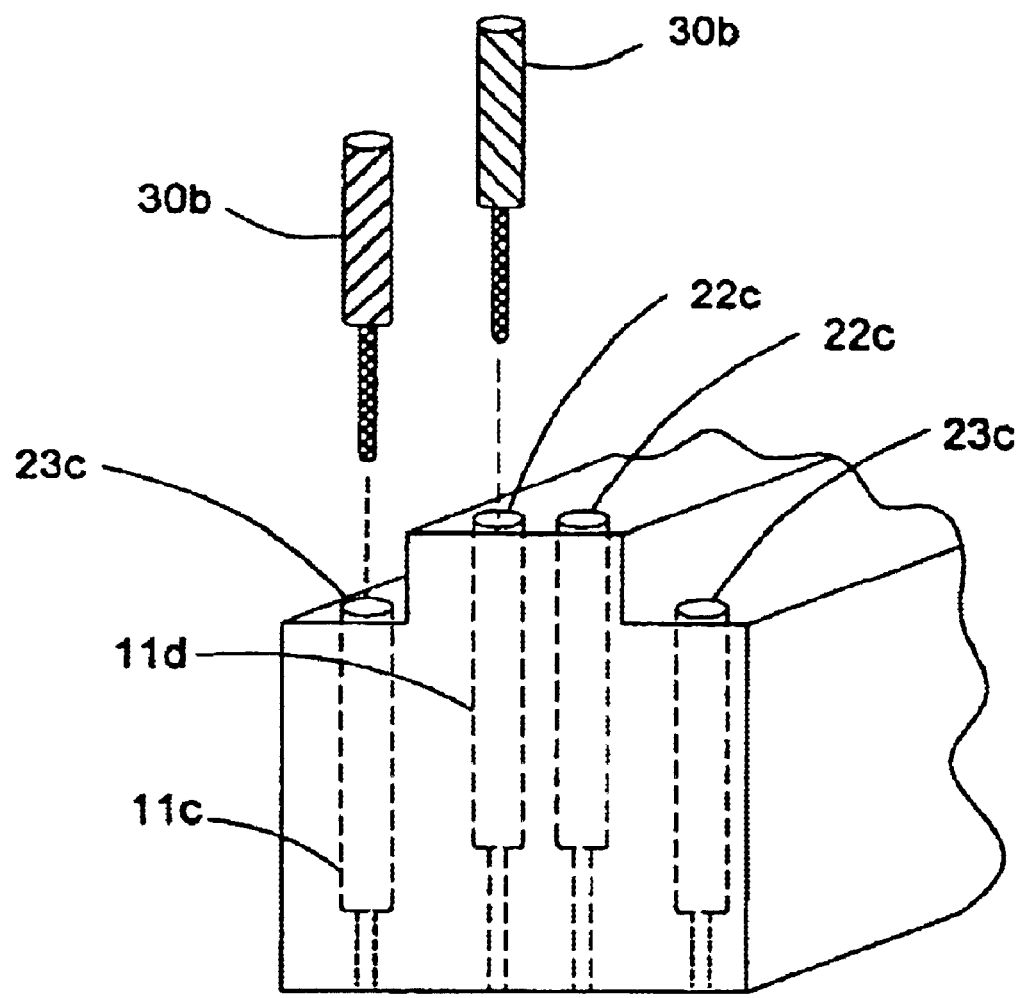
FIG. 12 is a partial schematic view of a connector block with apertures and plug connectors disposed therein according to an illustrative embodiment of the present invention.

As shown in FIG. 12, the connector block 20 includes apertures 22c and 23c that contain electrical connecting elements that connect to the anode terminating elements 2c and cathode terminating elements 3d inserted therein. Preferably, the apertures 22c and 23d comprise plug connectors 30a and 30b seated into bores 11c and 11d, respectively, in the corer block 20. When the anode terminating element 2c and cathode terminating element 3d are inserted and engaged by the apertures 22c and 23c (and the electrical connecting elements contained therein), the connector block 20 provides mechanical support for the fuel cell so engaged, and also provides for electrical connection to the cathode terminating elements and anode terminating elements of the fuel cells so engaged.

Figure 5:
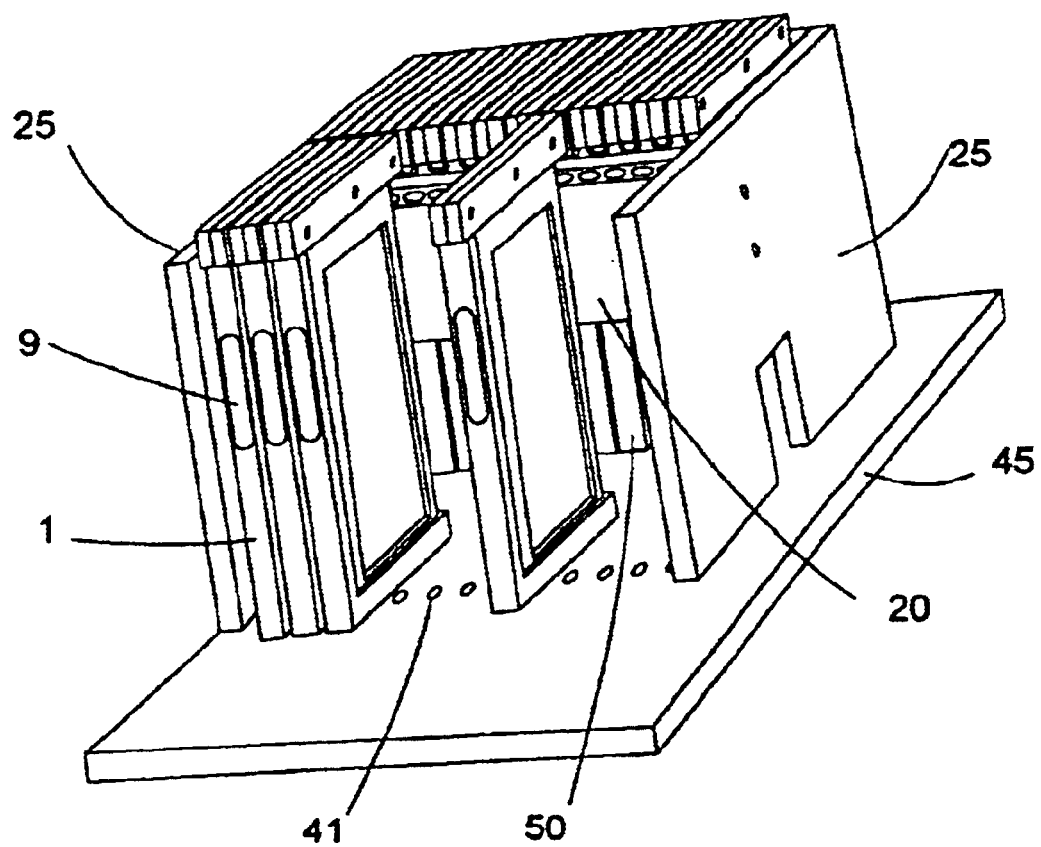
FIG. 5 is an isometric view of fuel cells stacked on a connector block and positioning tray according to an illustrative embodiment of the present invention.

FIG. 4 is an isometric view of two connector blocks 20 of the present invention adjacently aligned. Each connector block 20 has a central raised section 20a and outer peripheral ledges 20b and 20c. Two rows of apertures 22c and 22c' are disposed in raised section 20a and so contain plugs 30 which slidably engage the anode terminating elements 2c of cells positioned on both lateral sides of block 20 as shown in FIG. 5. Similarly, two rows of apertures 22c and 22c' are disposed in outer peripheral ledges 20b and 20c, respectively, and contain plugs 30 which slidably engage the cathode terminating elements 2c of cells positioned on both lateral sides of block 20 as shown in FIG. 5.

Figure 6:
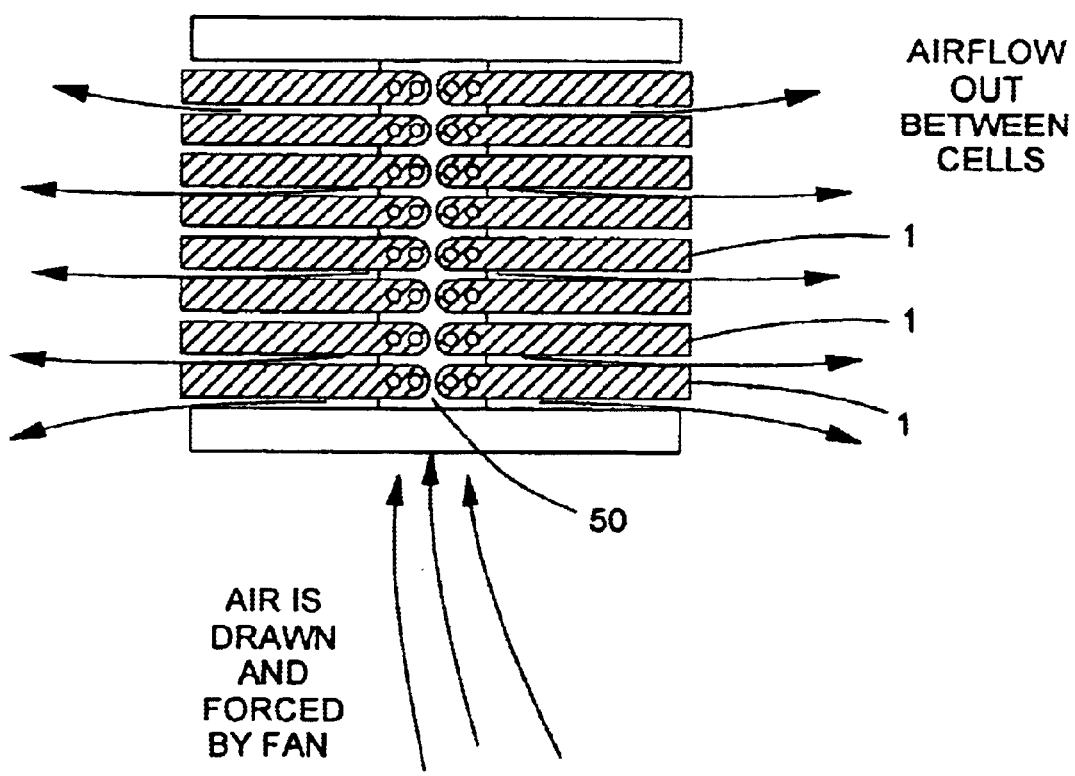
FIG. 6 is a schematic top view of the fuel cells of FIG. 5 in a completed stack, showing air flow direction, according to an illustrative embodiment of the present invention.

In addition, FIGS. 4, 5 and 6 illustrates the connector block 20 with supporting end elements having air circulation fans according to an illustrative embodiment of the present invention. FIG. 4 illustrates two abutting connector block assemblies each includes end support members 25 integrated with the ends of a connector block 20 (such as with a bolted connection and such support members maintain the block in the elevated position for engagement with the respective fuel cells). In addition, the support members 25 include fans 28 (powered by the cells themselves or from an external source) integrated therein which force air into the cells and against all the respective cell cathodes as shown in FIG. 6 (the arrows indicate air flow direction). As seen in FIG. 5, engagement between the fuel cells 1 and the block 20 forms a central open air duct 50 beneath the block 20 which is closed at both ends by the support member 25. The fans 28 blow air into the air duct 50, which is then forced out laterally between the fuel cells and a the cathode elements for maximized air contact and depolarization as illustrated in FIG. 6.

As shown in FIG. 3, a wall (for example, the end wall 5a as shown) of the fuel cell 1 preferably includes a key aperture 40, which is adapted to engage keyed protrusion 41 in supporting battery tray 45. As a result, each fuel cell 1 is preferably held on three sides: on the upper end by engagement of the block 20 with the respective plug connectors, with a buttress against the inner edges of the cells between the block 20, and the cathode current collector and by the keyed connection at the base. All three connections arc readily disengaged by a lifting of the individual cells off the connector block.

As also shown in FIG. 5 each fill cell 1 is provided with a window 9 at the appropriate electrolyte level whereby decrease in electrolyte level is readily apparent.

Figure 7:
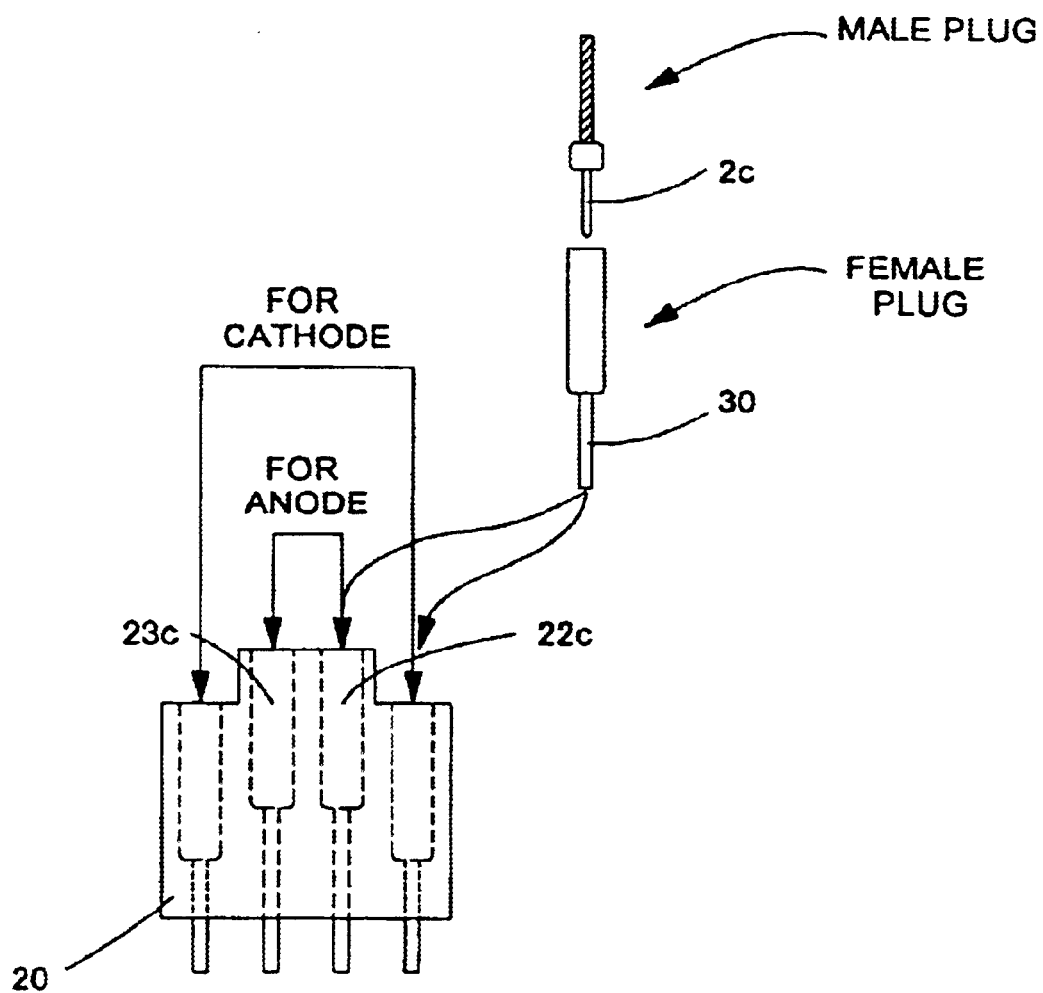
FIG. 7 is a cross section of the connector block with male and female plug connection elements according to an illustrative embodiment of the present invention.
Figure 13:
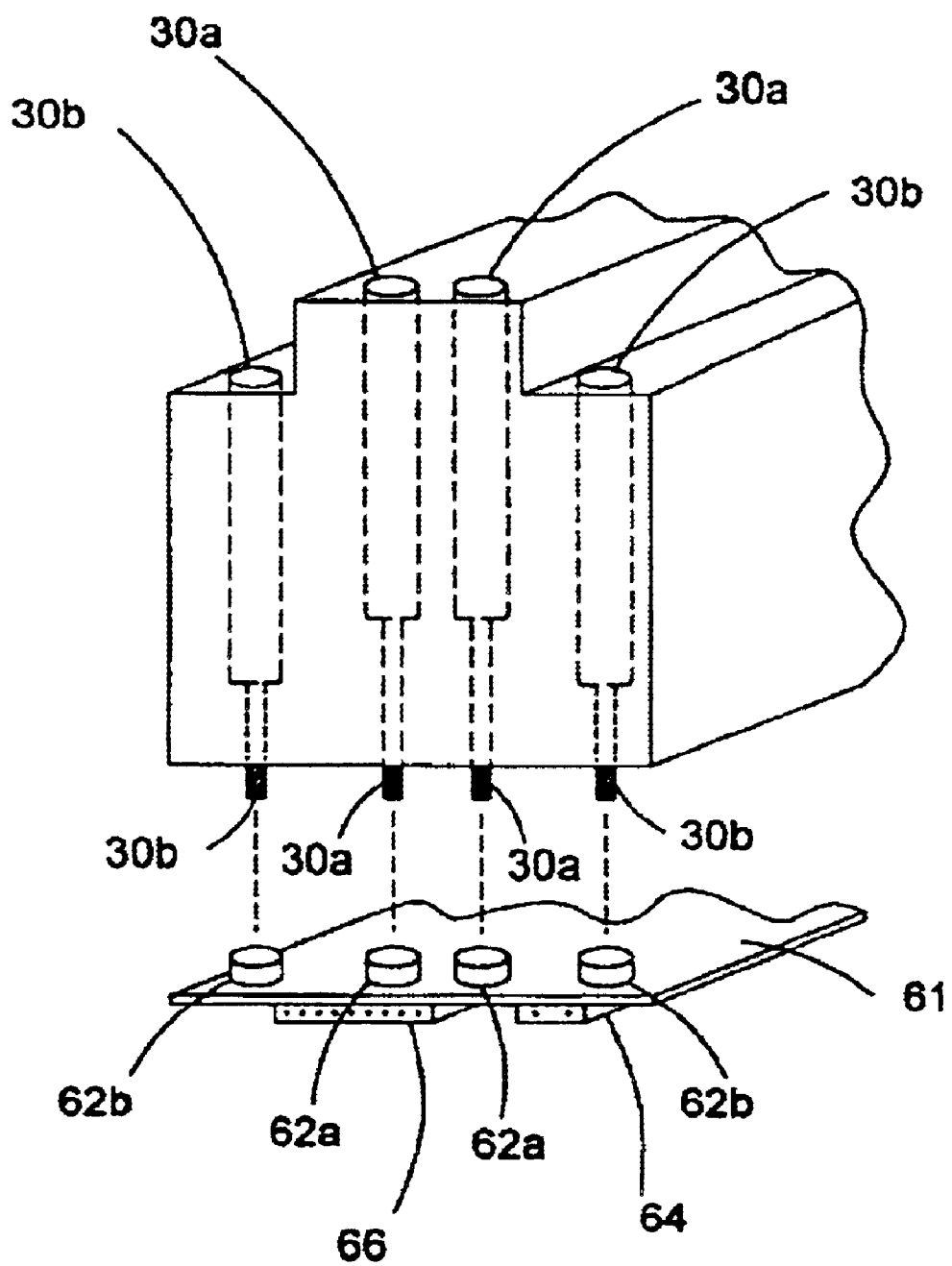
FIG. 13 is a partial schematic view of the connector block of FIG. 12 having a PC board integrated therein with a switching network that enables selective interconnection of the anodes and cathodes of the cells coupled thereto into a desired electrical interconnection arrangement.

FIGS. 7, 8, and 13 are schematic representations of exemplary embodiments of the connector block 20 according to the present invention, wherein the connector block 20 includes an integral interconnection means for electrically connecting the anodes and cathodes of the stacked cells into a desired electrical interconnection. As seen in FIG. 7, block 20 is cored with through holes 22c and 23c into which female plugs 30 are seated. The female plugs have a receptacle core for engagement with the mating plugs 3d (which are electrically connected to the cathode terminating elements for the fuel cells releasably engaged by the connector block 20) or mating plugs 2c (which are electrically connected to the anode terminating elements for the fuel cells releasably engaged by the connector block 20). In addition, the female plugs have conductive ends (as shown, such ends are threaded), for external engagement, at the bottom of the control block 20, with interconnection devices.

Figure 8B:
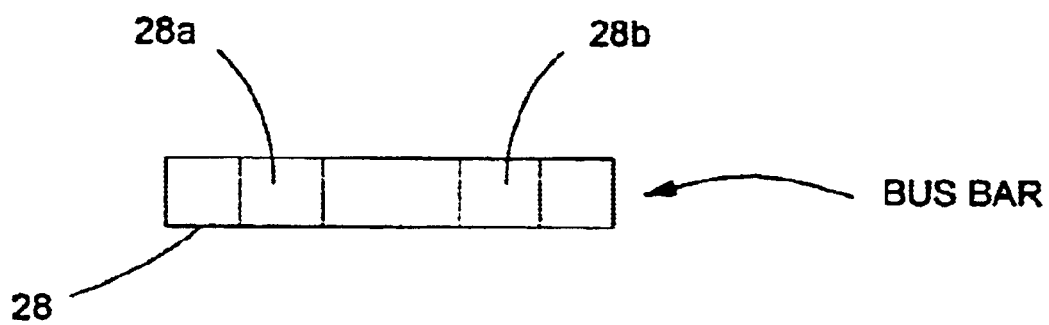
Figure 8A:
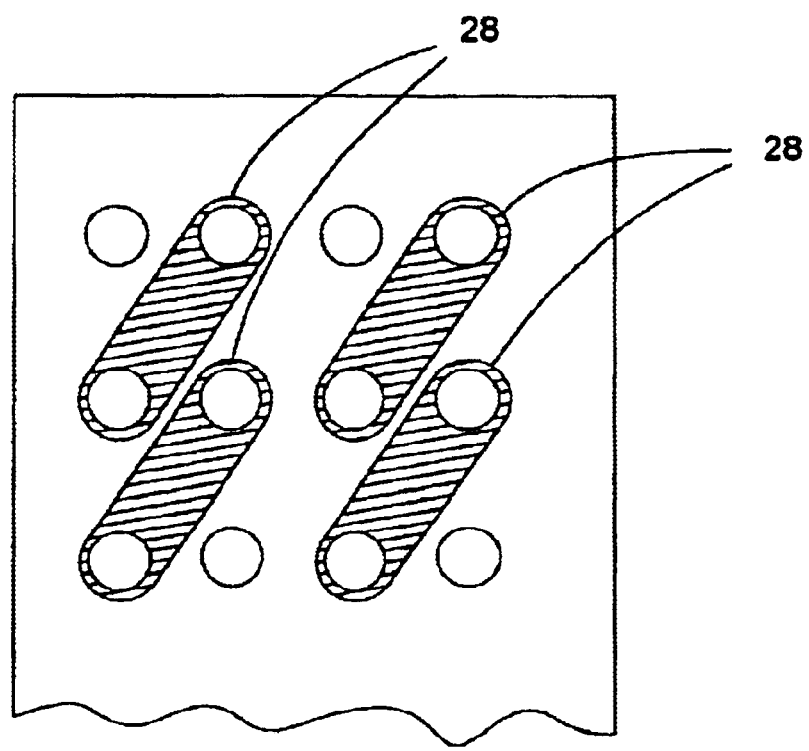
FIG. 8a is a bottom view of bus bars showing connections of successive cell anodes and cathodes in a serial cell connection arrangement according to an illustrative embodiment of the present invention

FIGS. 8a and 8b illustrate an exemplary embodiment for interconnecting the anode and cathodes of the fuel cells engaged with the connector block 20 wherein a portion of the underside of block 20 is shown with interconnector elements 28 providing successive connection engagement of anodes and cathode elements of adjacent cells in a serial connection. As further shown in FIG. 8b the interconnector elements 28 are bus bars with two apertures 28a and 28b for engagement with the extending ends of the female plugs in connector block 20. The arrangement of interconnector elements 28 enables the electrical connection of the anodes and cathodes of the stacked cells into a desired electrical interconnection arrangement (serial, parallel and mixed serial and parallel segments).

FIG. 13 illustrates another exemplary embodiment for interconnecting the anode and cathodes of the fuel cells engaged with the connector block 20. In this embodiment, a printed circuit (PC) board 61 includes a plurality of receptacles 62a that mate with the ends of the anode plug connectors 30a that extend from the underside of the connecting block 20, and a plurality of receptacles 62b that mate with the ends of the cathode plug connectors 30b that extend from the underside of the connecting block 20. In addition, the PC board includes a switching network, coupled to the receptacles and to output terminals 64, that operates in response to control signals communicated from a controller (not shown) via a control port 66, to selectively electrically-couple together the receptacles and to selectively electrically-couple one or more receptacles to the output terminals 64, to thereby provide for interconnection of the anodes and cathodes of the stacked cells into a desired electrical interconnection arrangement (serial, parallel and mixed serial and parallel segments) for output to the terminals 64.

Figure 9A:
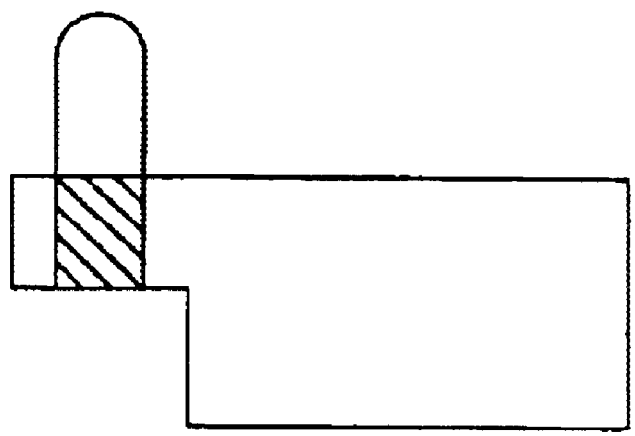
FIGS. 9a and 9b depict alternative configurational extensions of the connection elements of the electrode according to the present invention.
Figure 9B:
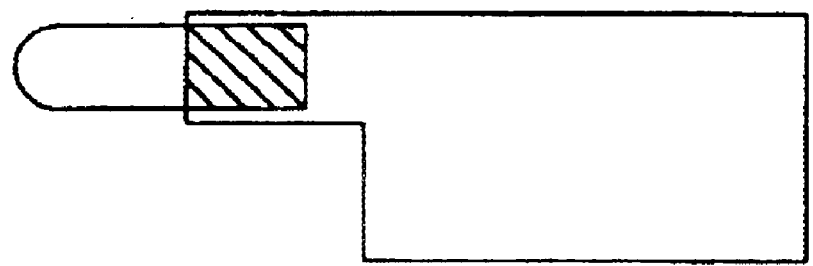

In other embodiments, as shown in FIGS. 9a and 9b, the electrode plug elements are shown to extend upwardly and laterally respectively. In such embodiments, the connector block (not shown) is correspondingly apertured. Similarly, the male and female plugs may be reversed, though with some complication in the connecting structure.

It should be understood that the illustrative embodiments set forth above describing metal-air FCB devices (and systems) of the present invention can be readily modified and adapted to apply to any arbitrary type of fuel cell, including hydrogen-based fuel cells. More particularly, in hydrogen-based fuel cell, the anode typically comprises a hydrogen supply structure that leads to a membrane that permits hydrogen ions to pass through into the ionically-conducting medium. In such systems, replacement of the anode structure typically involves replacement of this membrane, and possibly replacement of this hydrogen supply structure.

It is understood that the above embodiment and discussion are illustrative of the present invention and descriptions therein are not be construed as limitations on the present invention. It is understood that changes in components, structure materials, cell types and the like may be made without departing from the scope of the present invention as defined in the following claims.

What is claimed is:

1. A fuel cell battery structure comprising:
   at least two fuel cells each comprising an anode, cathode, and an ionically-conducting medium disposed therebetween;
   a connector block, disposed adjacent to one side of the at least two fuel cells, comprising means for electrically connecting the anodes and cathodes of the stacked cells into an electrical interconnection selected from the group consisting of series electrical interconnection, parallel electrical interconnection and mixed series and parallel electrical interconnection, and wherein said block mechanically holds the respective fuel cells in a fixed position as a result of mechanical engagement;
   wherein another side of the at least two fuel cells remains exposed to permit disengagement and removal of the fuel cells from the connector block; and
   wherein the anode and cathode of each cell comprise a terminal conductor element positioned on one side of the respective fuel cells, wherein said block is elongated along a longitudinal axis and said cells are axially engaged with said block; wherein said block comprises at least two rows of apertures extending along said axis; wherein said terminal conductor elements of said anodes and cathodes extend away from the respective cells and are adapted to be respectively inserted and engaged with said apertures, wherein the terminal conductor elements of said anodes, when said cells are aligned, are offset from the terminal conductor elements of the cathodes, wherein the terminal conductor elements of the anodes are engaged with apertures in one of said rows and the terminal conductor elements of the cathodes are engaged with apertures of the other of said rows.

2. The fuel cell battery of claim 1, wherein the terminal conductor elements of the anodes and cathodes are configured in downwardly extending U-shaped configurations and said apertures in said block are positioned in an upper surface thereof, whereby the individual fuel cells are mechanically fixed against the block with engagement of the terminal conductor elements and the apertures of said block.

3. The fuel cell battery of claim 1, wherein said block comprises two pairs of rows of apertures adapted for engagement with the anode and cathode terminal conductor elements of at least two fuel cells laterally positioned against two lateral sides of said block.

4. The fuel cell battery of claim 3 wherein the fuel cells are air depolarized and wherein a spacing for air ingress is provided between adjacent cells on each side of said blocks.

5. The fuel cell battery of claim 4 wherein the block and the ends of the cells, adjacent the block, define an air duct for channeling of air to said cells for the depolarization thereof.

6. The fuel cell battery of claim 5, wherein said block is supported by support means to provide an open area beneath said block as part of said air duct.

7. The fuel cell battery of claim 6, wherein said support means further support air movement control means for providing and moving air within said air duct to said cells.

8. The fuel call battery of claim 7, wherein said air movement control means comprises at least one fan attached to at least one of said block support means.

9. The fuel cell battery of claim 7, wherein said block comprises a solid rectangular configuration with lateral flange ledges wherein each of said ledges comprises one of said rows of apertures on an upper surface thereof and wherein an upper surface of the solid rectangle comprises a pair of rows, wherein the apertures in said ledges are adapted to be engaged with terminal conductor elements of one of the anode and cathode of the cells respectively adjacent thereto, and wherein the apertures in the pair of rows of the solid rectangle are adapted to be engaged with the terminal conductor elements of the other of said anode and cathode of the cells respectively adjacent thereto.

10. The fuel cell battery of claim 9, wherein the battery further comprises a support tray, with said fuel cells, engaged with said block being further supported by said tray and wherein said tray and said fuel cells comprising co-fitting key elements to help maintain said fuel cells in position relative to said block.

11. The fuel cell battery of claim 9, wherein the terminal conductor elements of the anodes and cathodes are configured in downwardly extending U-shaped configurations, whereby the individual fuel cells are mechanically fixed against the block with engagement of the terminal conductor elements and the apertures of said block.

12. The fuel cell battery of claim 9, wherein said apertures are through apertures, and said block is comprised of an electrically insulating material; wherein the means for electrically connecting the anodes and cathodes of the stacked cells into a desired electrical interconnection comprises electrically conductive receptacle elements disposed within each of said apertures for engagement with said terminal conductor elements and for selective electrical interconnection into an electrical interconnection selected farm the group consisting of series electrical interconnection, parallel electrical interconnection and mixed series and parallel electrical interconnection.

13. The fuel cell battery of claim 12, wherein said receptacle elements each comprise a conductive member which extends from the respective through apertures and which conductive members are engaged by electrically conductive bus bar members to effect said electrical interconnection.

14. A fuel cell adapted for use in the battery structure of claim 1, comprising a flat plate structure configuration comprised of a replaceable zinc anode plate disposed between two air depolarizing cathode plates and separated therefrom by separator means, wherein the cathode plates are peripherally held in a sealed frame structure whereby a surface of each of said cathodes is externally exposed for contact with depolarizing air; said cell further comprising an anode current collector extending along an edge of said anode and terminating in a terminal conductor element which extends externally on one side of said cell and wherein said cell comprises a cathode current collector electrically engaged with said cathode plates which terminates in a terminal conductor element which extends externally on said one side of said cell.

15. A fuel cell battery (FCB) device comprising:
a plurality of fuel cells each comprising a cathode, an anode, and an ionically-conducting medium disposed therebetween, the cathode having at least one cathode element and a cathode terminating element electrically coupled thereto, the anode having at least one anode element and an anode terminating element electrically coupled thereto; and
a connector block that supports the plurality of fuel cells and that independently and releasably engages each of the plurality of fuel cells, wherein the connector block further comprises a configuration means integral thereto; the configuration means, electrically coupled to the cathode terminating element and anode terminating element of the plurality of fuel cells, for configuring the plurality of fuel cells into an electrical interconnection selected from the group consisting of series electrical interconnection, parallel electrical interconnection and mixed series and parallel electrical interconnection,
wherein the cathode of a given fuel cell further comprises a cathode support structure, wherein the anode of the given fuel cell further comprises an anode support structure, and wherein at least one of the cathode support structure and anode support structure of the given fuel cell has post extending therefrom that is slidably inserted into an aperture in the connector block for the given fuel cell such that the connector block supports the given fuel cell.

16. A fuel cell battery (FCB) device comprising:
a plurality of fuel cells each comprising a cathode, an anode, and an ionically-conducting medium disposed therebetween, the cathode having at least one cathode element and a cathode terminating element electrically coupled thereto, the anode having at least one anode element and an anode terminating element electrically coupled thereto; and
a connector block that supports the plurality of fuel cells and that independently and releasably engages each of the plurality of fuel cells, wherein the connector block further comprises a configuration means integral thereto; the configuration means, electrically coupled to the cathode terminating element and anode terminating element of the plurality of fuel cells, for configuring the plurality of fuel cells into an electrical interconnection selected from the group consisting of series electrical interconnection, parallel electrical interconnection and mixed series and parallel electrical interconnection,
wherein the cathode of a given fuel cell further comprises a cathode support structure having a first post extending therefrom that is slidably inserted into a first aperture in the connector block for the given fuel cell, and wherein the anode of the given fuel cell further comprises an anode support structure having a second post extending therefrom that is slidably inserted into a second aperture in the connector block for the given fuel cell.

17. A fuel cell battery (FCB) device comprising:
a plurality of fuel cells each comprising a cathode, an anode, and an ionically-conducting medium disposed therebetween, the cathode having at least one cathode element and a cathode terminating element electrically coupled thereto, the anode having at least one anode element and an anode terminating element electrically coupled thereto; and
a connector block that supports the plurality of fuel cells and that independently and releasably engages each of the plurality of fuel cells, wherein the connector block further comprises a configuration means integral thereto; the configuration means, electrically coupled to the cathode terminating element and anode terminating element of the plurality of fuel cells for configuring the plurality of fuel cells into an electrical interconnection selected from the group consisting of series electrical interconnection, parallel electrical interconnection and mixed series and parallel electrical interconnection,
wherein the connector block comprises a plurality of engagement elements, corresponding to the cathodes and anodes of the plurality of fuel cells, that releasably engage the corresponding cathode and anode and that provide electrical connection to the cathode terminating element and anode terminating element of the corresponding cathode and anode, wherein the cathode of a given fuel cell further comprises a cathode support structure having a first post extending therefrom, the first post comprising a first male electrical connecting element electrically coupled to the cathode terminating element of the given fuel cell, wherein the anode of a given fuel cell further comprises an anode support structure having a second post extending therefrom, the second post comprising a second male electrical connecting element electrically coupled to the anode terminating element of the given fuel cell, wherein the plurality of engagement elements of the connector block comprise first and second apertures corresponding to the cathodes and anodes of the plurality of fuel cells, the first aperture for a given fuel cell comprising a first female electrical connecting element and the second aperture for a given fuel cell comprising a second female electrical connecting element; and wherein the first post of a given fuel cell is slidably inserted into the first aperture for the given fuel cell to electrically couple the first female electrical connecting element to the first male electrical connecting element of the given fuel cell and to the cathode terminating element of the given fuel cell coupled to the first male electrical connecting element, and wherein the second post of a given fuel cell is slidably inserted into the second aperture for the given fuel cell to electrically couple the second female electrical connecting element to the second male electrical connecting element of the given fuel cell and to the anode terminating element of the given fuel cell coupled to the second male electrical connecting element.

18. The FCB device of claim 17, wherein the configuration means comprises interconnector elements affixed to terminal ends of the first and second female electrical connecting elements of different fuel cells.

19. The FCB device of claim 17, wherein the configuration means comprises a switching network electrically coupled to the first and second female electrical connecting elements of the plurality of fuel cells, wherein the switching network operates in response to control signals from a controller, to configure the plurality of fuel cells into a desired interconnection arrangement for output to at least one pair of output terminals.

20. The FCB device of claim 17, wherein said connector block is elongated along a longitudinal axis, and each fuel cell extends from the longitudinal axis, wherein the engagement elements of the connector block comprise at least two rows of apertures extending along said axis; wherein one of said rows of apertures comprises a set of first interconnecting elements in electrical connection to the cathode terminating elements for a set of fuel cells, and another of said rows of apertures comprises a set of second interconnecting elements in electrical connection to the anode terminating elements for the set of fuel cells.

21. The FCB device of claim 20, wherein said connector block comprises two lateral side surfaces that extend along the longitudinal axis, wherein a first set of fuel cells extend from one of the side surfaces and a second set of fuel cells extend from the other one of the side surfaces.

22. The FCB device of claim 21, wherein said connector block comprises two pairs of rows of apertures, one pair of rows of apertures in electrical connection to the cathode terminating elements and anode terminating elements for the first set of fuel cells, and the other pair of rows of apertures in electrical connection to the cathode terminating elements and anode terminating elements for the first set of fuel cells.

23. A fuel cell battery (FCB) device comprising:
a plurality of fuel cells each comprising a cathode, an anode, and an ionically-conducting medium disposed therebetween, the cathode having at least one cathode element and a cathode terminating element electrically coupled thereto, the anode having at least one anode element and an anode terminating element electrically coupled thereto;
a connector block that supports the plurality of fuel cells and that independently and releasably engages each of the plurality of fuel cells, wherein the connector block further comprises a configuration means integral thereto: the configuration means, electrically coupled to the cathode terminating element and anode terminating element of the plurality of fuel cells, for configuring the plurality of fuel cells into an electrical interconnection selected from the group consisting of series electrical interconnection, parallel electrical interconnection and mixed series and parallel electrical interconnection, and
end supports, coupled to ends of the connector block, that provides an open area beneath the connector block,
wherein the cathode element of each fuel cell comprises an air cathode and the anode element comprises a metal-fuel, and wherein a spacing for air movement is provided between adjacent fuel cells.

24. The FCB device of claim 23, further comprising a support tray, wherein the support tray, end supports, and open area beneath the connector block define an air duct for channeling air to the fuel cells.

25. The FCB device of claim 24, wherein at least one end support comprises air movement control means for providing and moving air into the air duct and out through the spacing between adjacent fuel cells.

26. The FCB device of claim 25, wherein said air movement control means comprises at least one fan.

27. The FCB device of claim 20, wherein said connector block comprises at least two lateral stepped ledges, one of said ledges comprising one of said rows of apertures, and another of said ledges comprising the other of said rows of apertures.

28. A fuel cell battery (FCB) device comprising:
a plurality of fuel cells each comprising a cathode, an anode, and an ionically-conducting medium disposed therebetween, the cathode having at least one cathode element and a cathode terminating element electrically coupled thereto, the anode having at least one anode element and an anode terminating element electrically coupled thereto;
a connector block that supports the plurality of fuel cells and that independently and releasably engages each of the plurality of fuel cells, wherein the connector block further comprises a configuration means integral thereto; the configuration means, electrically coupled to the cathode terminating element and anode terminating element of the plurality of fuel cells, for configuring the plurality of fuel cells into an electrical interconnection selected from the group consisting of series electrical interconnection, parallel electrical interconnection and mixed series and parallel electrical interconnection and
a support tray for supporting said plurality of fuel cells, wherein said tray and said fuel cells comprising co-fitting key elements to help maintain said fuel cells in a fixed position.

29. A fuel cell battery (FCB) device comprising:

a plurality of fuel cells each comprising a cathode, an anode, and an ionically-conducting medium disposed therebetween, the cathode having at least one cathode element and a cathode terminating element electrically coupled thereto, the anode having at least one anode element and an anode terminating element electrically coupled thereto; and a connector block that supports the plurality of fuel cells and that independently and releasably engages each of the plurality of fuel cells, wherein the connector block further comprises a configuration means integral thereto; the configuration means, electrically coupled to the cathode terminating element and anode terminating element of the plurality of fuel cells, for configuring the plurality of fuel cells into an electrical interconnection selected from the group consisting of series electrical interconnection, parallel electrical interconnection and mixed series and parallel electrical interconnections, wherein said connector block is formed from a solid base of electrically insulating material.

30. A fuel cell battery (FCB) device comprising:

a plurality of fuel cells each comprising a cathode, an anode, and an ionically-conducting medium disposed therebetween, the cathode having at least one cathode element and a cathode terminating element electrically coupled thereto, and the anode having at least one anode element and anode terminating element electrically coupled thereto;

a connector block having a plurality of first and second engagement elements, corresponding to cathodes and anodes, respectively, of the plurality of fuel cells, that independently and releasably engage the corresponding cathode and anode to provide electrical connection to the cathode terminating element and anode terminating element of the corresponding cathode and anode, wherein the cathode of a given fuel cell further comprises a cathode support structure having an electrical connecting element electrically coupled to the cathode terminating element of the given fuel cell and slidably mated with the first engagement element for the cathode of the given fuel cell.

31. The FCB device of claim 30, wherein the first engagement element in the connector block for the given fuel cell comprises an electrical connecting element electrically coupled to the electrical connecting element of the cathode support structure slidably mated thereto.

32. The FCB device of claim 30, wherein the anode of a given fuel cell further comprises an anode support structure having an electrical connecting element electrically coupled to the anode terminating element of the given fuel cell and slidably mated with the second engagement element for the anode of the given fuel cell.

33. The FCB device of claim 32, wherein the second engagement element in the connector block for the given fuel cell comprises an electrical connecting element electrically coupled to the electrical connecting element of the anode support structure slidably mated thereto.

34. The FCB device of claim 30, wherein the connector block further comprises a configuration means integral thereto; the configuration means, electrically coupled to the cathode terminating elements and anode terminating elements of the fuel cells, for configuring the plurality of fuel cells into an electrical interconnection selected from the group consisting of series electrical interconnection parallel electrical interconnection and mixed series and parallel electrical interconnection.

35. The FCB device of claim 34, wherein the configuration means comprises interconnector elements affixed to the terminal ends of electrical connecting elements that slidably mate with interconnecting elements electrically coupled to the cathode terminating elements and anode terminating elements for the cathodes and anodes of different fuel cells.

36. The FCB device of claim 34, wherein the configuration means comprises a switching network electrically coupled to terminal ends of electrical connecting elements that slidably mate with interconnecting elements electrically coupled to the cathode terminating elements and anode terminating elements for the cathodes and anodes of the plurality of fuel cells, wherein the switching network operates under in response to control signals from a controller, to configuring the plurality of fuel cells into an electrical interconnection selected from the group consisting of series electrical interconnection, parallel electrical interconnection and mixed series and parallel electrical interconnection for output to at least one pair of output terminals.

37. The FCB device of claim 30, wherein the anode element of a given fuel cell is removably positioned adjacent to the cathode element of the given fuel cell.

38. The FCB device of claim 30, wherein the electrical connecting element of the cathode support structure of a given fuel cell comprises a post extending therefrom that is slidably inserted into a first aperture in the connector block for the given fuel cell such that the connector block supports the given fuel cell.

39. The FCB device of claim 32, wherein the electrical connecting element of the anode support structure of a given fuel cell comprises a post extending therefrom that is slidably inserted into a second aperture in the connector block for the given fuel cell such that the connector block supports the given fuel cell.

40. The FCB device of claim 30, wherein said connector block is elongated along a longitudinal axis, and each fuel cell extends from the longitudinal axis, wherein said connector block comprises at least two rows of engagement elements extending along said axis; wherein one of said rows of engagement elements comprises a set of first interconnecting elements in electrical connection to the cathode terminating elements for a set of fuel cells, and another of said rows of engagement elements comprises a set of second interconnecting elements in electrical connection to the anode terminating elements for the set of fuel cells.

41. The FCB device of claim 40, wherein said connector block comprises two lateral side surfaces that extend along the longitudinal axis, wherein a fiat set of fuel cells extend from one of the side surfaces and a second set of fuel cells extend from the other one of the side surfaces.

42. The FCB device of claim 40, wherein said connector block comprises two pairs of rows of engagement elements, one pair of rows of engagement elements in electrical connection to the cathode terminating elements and anode terminating elements for the first set of fuel cells, and the other pair of rows of engagement elements in electrical connection to the cathode terminating elements and anode terminating elements for the first set of fuel cells.

43. The FCB device of claim 30, wherein the cathode element of each fuel cell comprises an air cathode and the anode element comprises a metal-fuel, and wherein a spacing for air movement is provided between adjacent cells.

44. The FCB device of claim 43, further comprising end supports, coupled to ends of the connector block, that provides an open area beneath the connector block.

45. The FCB device of claim 44, further comprising a support tray, wherein the support tray, end supports, and open area beneath the connector block define an air duct for channeling air to the fuel cells.

46. The FCB device of claim 45, wherein at least one end support comprises air movement control means for providing and moving air into the air duct and out through the spacing between adjacent cells.

47. The FCB device of claim 46, wherein said air movement control means comprises at least one fan.

48. The FCB device of claim 40, wherein said connector block comprises at least two lateral stepped ledges, one of said ledges comprising one of said rows of engagement elements, and another of said ledges comprising the other of said rows of engagement elements.

49. The FCB device of claim 30, further comprising a support tray for supporting said plurality of fuel cells, wherein said tray and said fuel cells comprising co-fitting key elements to help maintain said fuel cells in a fixed position.

50. The FCB device of claim 30, wherein said connector block is formed from a solid base of electrically insulating material.

51. The fuel cell battery structure of claim 1, wherein each fuel cell comprises a metal fuel anode and air cathode.

52. The fuel cell battery structure of claim 1, wherein each fuel cell comprises a hydrogen-based fuel cell.

53. The FCB device of claim 15, wherein each fuel cell comprises a metal fuel anode and air cathode.

54. The FCB device of claim 15, wherein each fuel cell comprises a hydrogen-based fuel cell.

55. The FCB device of claim 30, wherein each fuel cell comprises a meal fuel anode and air cathode.

56. The FCB device of claim 30, wherein each fuel cell comprises a hydrogen-based fuel cell.

57. A fuel cell battery (FCB) device comprising:
a plurality of fuel cells each comprising a cathode, an anode, and an ionically-conducting medium disposed therebetween, the cathode having at least one cathode element and a cathode terminating element electrically coupled thereto, and the anode having at least one anode element and anode terminating element electrically coupled thereto;
a connector block having a plurality of first and second engagement elements, corresponding to cathodes and anodes, respectively, of the plurality of fuel cells, that independently and releasably engage the corresponding cathode and anode to provide electrical connection to the cathode terminating element and anode terminating element of the corresponding cathode and anode,
wherein said connector block is elongated along a longitudinal axis, and each fuel cell extends from the longitudinal axis, wherein said connector block comprises at least two rows of engagement elements extending along said axis; wherein one of said rows of engagement elements comprises a set of first interconnecting elements in electrical connection to the cathode terminating elements for a set of fuel cells, and another of said rows of engagement elements comprises a set of second interconnecting elements in electrical connection to the anode terminating elements for the set of fuel cells.

58. The FCB device of claim 57, wherein the cathode of a given fuel cell farther comprises a cathode support structure having an electrical connecting element electrically coupled to the cathode eliminating element of the given fuel cell and slidably mated with the first engagement element for the cathode of the given fuel cell.

59. The FCB device of claim 58, wherein the first engagement element in the connector block for the given fuel cell comprises an electrical connecting element electrically coupled to the electrical connecting element of the cathode support structure slidably mated thereto.

60. The FCB device of claim 57, wherein the anode of a given fuel cell further comprises an anode support structure having an electrical connecting element electrically coupled to the anode terminating element of the given fuel cell and slidably mated with the second engagement element for the anode of the given fuel cell.

61. The FCB device of claim 60, wherein the second engagement element in the connector block for the given fuel cell comprises an electrical connecting element electrically coupled to the electrical connecting element of the anode support structure slidably mated thereto.

62. The FCB device of claim 57, wherein the connector block further comprises a configuration means integral thereto; the configuration means, electrically coupled to the cathode terminating elements and anode terminating elements of the fuel cells, for configuring the plurality of fuel cells into an electrical interconnection selected from the group consisting of series electrical interconnection, parallel electrical interconnection and mixed series and parallel electrical interconnection.

63. The FCB device of claim 62, wherein the configuration means comprises interconnector elements affixed to the terminal ends of electrical connecting elements that slidably mate with interconnecting elements electrically coupled to the cathode terminating elements and anode terminating elements for the cathodes and anodes of different fuel cells.

64. The FCB device of claim 62, wherein the configuration means comprises a switching network electrically coupled to terminal ends of electrical connecting elements that slidably mate with interconnecting elements electrically coupled to the cathode terminating elements and anode terminating elements for the cathodes and anodes of the plurality of fuel cells, wherein the switching network operates under in response to control signals from a controller, to configuring the plurality of fuel cells into an electrical interconnection selected from the group consisting of series electrical interconnection, parallel electrical interconnection and mixed series and parallel electrical interconnection for output to at least one pair of output terminals.

65. The FCB device of claim 57, wherein the anode element of a given fuel cell is removably positioned adjacent to the cathode element of the given fuel cell.

66. The FCB device of claim 58, wherein the electrical connecting element of the cathode support structure of a given fuel cell comprises a post extending therefrom that is slidably inserted into a first aperture in the connector block for the given fuel cell such that the connector block supports the given fuel cell.

67. The FCB device of claim 60, wherein the electrical connecting element of the anode support structure of a given fuel cell comprises a post extending therefrom that is slidably inserted into a second aperture in the connector block for the given fuel cell such that the connector block supports the given fuel cell.

68. The FCB device of claim 57, wherein said connector block comprises two lateral side surfaces that extend along the longitudinal axis, wherein a fist set of fuel cells extend from one of the side surfaces and a second set of fuel cells extend from the other one of the side surfaces.

69. The FCB device of claim 68, wherein said connector block comprises two pairs of rows of engagement elements, one pair of rows of engagement elements in electrical connection to the cathode terminating elements and anode terminating elements for the first set of fuel cells, and the other pair of rows of engagement elements in electrical connection to the cathode terminating elements and anode terminating elements for the first set of fuel cells.

70. The FCB device of claim 57, wherein the cathode element of each fuel cell comprises an air cathode and the anode element comprises a metal-fuel, and wherein a spacing for air movement is provided between adjacent cells.

71. The FCB device of claim 70, further comprising end supports, coupled to ends of the connector block, that provides an open area beneath the connector block.

72. The FCB device of claim 71, further comprising a support tray, wherein the support tray, end supports, and open area beneath the connector block define an air duct for channeling air to the fuel cells.

73. The FCB device of claim 72, wherein at least one end support comprises air movement control means for providing and moving air into the air duct and out through the spacing between adjacent cells.

74. The FCB device of claim 73, wherein said air movement control means comprises at least one fan.

75. The FCB device of claim 57, wherein said connector block comprises at least two lateral stepped ledges, one of said ledges comprising one of said rows of engagement elements, and another of said ledges comprising the other of said rows of engagement elements.

76. The FCB device of claim 57, further comprising a support tray for supporting said plurality of fuel cells, wherein said try and said fuel cells comprising co-fitting key elements to help maintain said fuel cells in a fixed position.

77. The FCB device of claim 57, wherein said connector block is formed from a solid base of electrically insulating material.

78. The fuel cell battery structure of claim 57, wherein each fuel cell comprises a metal fuel anode and air cathode.

79. The fuel cell battery structure of claim 57, wherein each fuel cell comprises a hydrogen-based fuel cell.

80. A fuel cell battery (FCB) device comprising:
   a plurality of fuel cells each comprising a cathode, an anode, and an ionically-conducting medium disposed therebetween, the cathode having at least one cathode element and a cathode terminating element electrically coupled thereto, the anode having at least one anode element and an anode terminating element electrically coupled thereto; and
   a connector block that supports the plurality of fuel cells and that independently and releasably engages each of the plurality of fuel cells,
   wherein the cathode of a given fuel cell further comprises a cathode support structure, wherein the anode of the given fuel cell further comprises an anode support structure, and wherein at least one of the cathode support structure and anode support structure of the given fuel cell has post extending therefrom that is slidably inserted into an aperture in the connector block for the given fuel cell such that the connector block supports the given fuel cell.

81. The FCB device of claim 80, wherein the connector block further comprises a configuration means integral thereto; the configuration means, electrically coupled to the cathode terminating element and anode terminating element of the plurality of fuel cells, for configuring the plurality of fuel cells into an electrical interconnection selected from the group consisting of series electrical interconnection, parallel electrical interconnection and mixed series and parallel electrical interconnection.

82. The FCB device of claim 80, wherein the anode element of a given fuel cell is removably positioned adjacent to the cathode element of the given fuel cell.

83. The FCB device of claim 80, wherein the cathode element of each fuel cell comprises an air cathode and the anode element comprises a metal-fuel, and wherein a spacing for air movement is provided between adjacent fuel cells.

84. A fuel cell battery (FCB) device comprising:
   a plurality of fuel cells each comprising a cathode, an anode, and an ionically-conducting medium disposed therebetween, the cathode having at least one cathode element and a cathode terminating element electrically coupled thereto, the anode having at least one anode element and an anode terminating element electrically coupled thereto; and
   a connector block tat supports the plurality of fuel cells and that independently and releasably engages each of the plurality of fuel cells,
   wherein the cathode of a given fuel cell further comprises a cathode support structure having a first post extending therefrom that is slidably inserted into a first aperture in the connector block for the given fuel cell, and wherein the anode of the given fuel cell further comprises an anode support structure having a second post extending therefrom that is slidably inserted into a second aperture in the connector block for the given fuel cell.

85. The FCB device of claim 84, wherein the connector block further comprises a configuration means integral thereto; the configuration means, electrically coupled to the cathode terminating element and anode terminating element of the plurality of fuel cells, for configuring the plurality of fuel cells into an electrical interconnection selected from the group consisting of series electrical interconnection, parallel electrical interconnection and mixed series and parallel electrical interconnection.

86. The FCB device of claim 84, wherein the anode element of a given fuel cell is removably positioned adjacent to the cathode element of the given fuel cell.

87. The FCB device of claim 84, wherein the cathode element of each fuel cell comprises an air cathode and the anode element comprises a metal-fuel, and wherein a spacing for air movement is provided between adjacent fuel cells.

88. A fuel cell battery (FCB) device comprising:
   a plurality of fuel cells each comprising a cathode, an anode, and an ionically-conducting medium disposed therebetween, the cathode having at least one cathode element and a cathode terminating element electrically coupled thereto, the anode having at least one anode element and an anode terminating element electrically coupled thereto; and
   a connector block that supports the plurality of fuel cells and that independently and releasably engages each of the plurality of fuel cells,
   wherein the connector block comprises a plurality of engagement elements, corresponding to the cathodes and anodes of the plurality of fuel cells, that releasably engage the corresponding cathode and anode and that provide electrical connection to the cathode terminating element and anode terminating element of the corresponding cathode and anode,
   wherein the cathode of a given fuel cell further comprises a cathode support structure having a first post extending therefrom, the first post comprising a first male electrical connecting element electrically coupled to the cathode terminating element of the given fuel cell, wherein the anode of a given fuel cell further comprises an anode support structure having a second post extending therefrom, the second post comprising a second male electrical connecting element electrically coupled to the anode terminating element of the given fuel cell, wherein the plurality of engagement elements of the connector block comprise first and second apertures corresponding to the cathodes and anodes of the plurality of fuel cells, the first aperture for a given fuel cell comprising a first female electrical connecting element and the second aperture for a given fuel cell comprising a second female electrical connecting element; and wherein the first post of a given fuel cell is slidably inserted into the first aperture for the given fuel cell to electrically couple the first female electrical connecting element to the first male electrical connecting element of the given fuel cell and to the cathode terminating element of the given fuel cell coupled to the first male electrical connecting element, and wherein the second post of a given fuel cell is slidably inserted into the second aperture for the given fuel cell to electrically couple the second female electrical connecting element to the second male electrical connecting element of the given fuel cell and to the anode terminating element of the given fuel cell coupled to the second male electrical connecting element.

89. The FCB device of claim 88, wherein the configuration means comprises interconnector elements affixed to terminal ends of the first and second female electrical connecting elements of different fuel cells.

90. The FCB device of claim 88, wherein the configuration means comprises a switching network electrically coupled to the first and second female electrical connecting elements of the plurality of fuel cells, wherein the switching network operates in response to control signals from a controller, to configure the plurality of fuel cells into a desired interconnection arrangement for output to at least one pair of output terminals.

91. The FCB device of claim 88, wherein said connector block is elongated along a longitudinal axis, and each fuel cell extends from the longitudinal axis, wherein the engagement elements of the connector block comprise at least two rows of apertures extending along said axis; wherein one of said rows of apertures comprises a set of first interconnecting elements in electrical connection to the cathode terminating elements for a set of fuel cells, and another of said rows of apertures comprises a set of second interconnecting elements in electrical connection to the anode terminating elements for the set of fuel cells.

92. The FCB device of claim 91, wherein said connector block comprises two lateral side surfaces that extend along the longitudinal axis, wherein a first set of fuel cells extend from one of the side surfaces and a second set of fuel cells extend from the other one of the side surfaces.

93. The FCB device of claim 92, wherein said connector block comprises two pairs of rows of apertures, one pair of rows of apertures in electrical connection to the cathode terminating elements and anode terminating elements for the first set of fuel cells, and the other pair of rows of apertures in electrical connection to the cathode terminating elements and anode terminating elements for the first set of fuel cells.

94. A fuel cell battery (FCB) device comprising:
a plurality of fuel cells each comprising a cathode, an anode, and an ionically-conducting conducting medium disposed therebetween, the cathode having at least one cathode element and a cathode terminating element electrically coupled thereto, the anode having at least one anode element and an anode terminating element electrically coupled thereto;

a connector block that supports the plurality of fuel cells and that independently and releasably engages each of the plurality of fuel cells;

end supports, coupled to ends of the connector block, that provides an open area beneath the connector block; and a support tray;

wherein the cathode element of each fuel cell comprises an air cathode and the anode element comprises a metal-fuel, and wherein a spacing for air movement is provided between adjacent fuel cells, and wherein the support tray, end supports, and open area beneath the connector block define an air duct for channeling air to the fuel cells.

95. The FCB device of claim 94, wherein at least one end support comprises air movement control means for providing and moving air into the air duct and out through the spacing between adjacent fuel cells.

96. The FCB device of claim 95, wherein said air movement control means comprises at least one fan.

97. A fuel cell battery (FCB) device comprising:
a plurality of fuel cells each comprising a cathode, an anode, and an ionically-conducting conducting medium disposed therebetween, the cathode having at least one cathode element and a cathode terminating element electrically coupled thereto, the anode having at least one anode element and an anode terminating element electrically coupled thereto; and a connector block that supports the plurality of fuel cells and that independently and releasably engages each of the plurality of fuel cells, wherein said connector block comprises at least two lateral stepped ledges, one of said ledges comprising one of said rows of apertures, and another of said ledges comprising the other of said rows of apertures.

98. A fuel cell battery (FCB) device comprising:
a plurality of fuel cells each comprising a cathode, an anode, and an ionically-conducting medium disposed therebetween, the cathode having at least one cathode element and a cathode terminating element electrically coupled thereto, the anode having at least one anode element and an anode terminating element electrically coupled thereto;

a connector block that supports the plurality of fuel cells and that independently and releasably engages each of the plurality of fuel cells; and a support tray for supporting said plurality of fuel cells, wherein said tray and said fuel cells comprising co-fitting key elements to help maintain said fuel cells in a fixed position.

99. A fuel cell battery (FCB) device comprising:
a plurality of fuel cells each comprising a cathode, an anode, and an ionically-conducting medium disposed therebetween, the cathode having at least one cathode element and a cathode terminating element electrically coupled thereto, the anode having at least one anode element and an anode terminating element electrically coupled thereto; and a connector block that supports the plurality of fuel cells and that independently and releasably engages each of the plurality of fuel cells, wherein said connector block is formed from a solid base of electrically insulating material.

100. A fuel cell battery (FCB) device comprising:

a plurality of fuel cells each comprising a cathode, an anode, and an ionically-conducting medium disposed therebetween, the cathode having at least one cathode element and a cathode terminating element electrically coupled thereto, and the anode having at least one anode element and anode terminating element electrically coupled thereto; and a connector block having a plurality of first and second engagement elements, corresponding to cathodes and anodes, respectively, of the plurality of fuel cells, that independently and releasably engage the corresponding cathode and anode to provide electrical connection to the cathode terminating element and anode terminating element of the corresponding cathode and anode, wherein the anode of a given fuel cell further comprises an anode support structure having an electrical connecting element electrically coupled to the anode terminating element of the given fuel cell and slidably mated with the second engagement element for the anode of the given fuel cell.

101. The FCB device of claim 100, wherein the second engagement element in the connector block for the given fuel cell comprises an electrical connect element electrically coupled to the electrical connecting element of the anode support structure slidably mated thereto.

102. A fuel cell battery (FCB) device comprising:

a plurality of fuel cells each comprising a cathode, an anode, and an ionically-conducting medium disposed therebetween, the cathode having at least one cathode element and a cathode terminating element electrically coupled thereto, and the anode having at least one anode element and anode terminating element electrically coupled thereto; and a connector block having a plurality of first and second engagement elements, corresponding to cathodes and anodes, respectively, of the plurality of fuel cells, that independently and releasably engage the corresponding cathode and anode to provide electrical connection to the cathode terminating element and anode terminating element of the corresponding cathode and anode, the connector block further comprising a configuration means integral thereto; the configuration means, electrically coupled to the cathode terminating elements and anode terminating elements of the fuel cells, for configuring the plurality of fuel cells into an electrical interconnection selected from the group consisting of series electrical interconnection, parallel electrical interconnection and mixed series and parallel electrical interconnection, wherein the configuration means comprises interconnector elements affixed to the terminal ends of electrical connecting elements that slidably mate with interconnecting elements electrically coupled to the cathode terminating elements and anode terminating elements for the cathodes and anodes of different fuel cells.

103. A fuel cell battery (FCB) device comprising:

a plurality of fuel cells each comprising a cathode, an anode, and an ionically-conducting medium disposed therebetween, the cathode having at least one cathode element and a cathode terminating element electrically coupled thereto, and the anode having at least one anode element and anode terminating element electrically coupled thereto; and a connector block having a plurality of first and second engagement elements, corresponding to cathodes and anodes, respectively, of the plurality of fuel cells, that independently and releasably engage the corresponding cathode and anode to provide electrical connection to the cathode terminating element and anode terminating element of the corresponding cathode and anode, the connector block further comprising a configuration means integral thereto; the configuration means, electrically coupled to the cathode terminating elements and anode terminating elements of the fuel cells, for configuring the plurality of fuel cells into an electrical interconnection selected from the group consisting of series electrical interconnection, parallel electrical interconnection and mixed series and parallel electrical interconnection, wherein the configuration means comprises a switching network electrically coupled to terminal ends of electrical connecting elements that slidably mate with interconnecting elements electrically coupled to the cathode terminating elements and anode terminating elements for the cathodes and anodes of the plurality of fuel cells, wherein the switching network operates under in response to control signals from a controller, to configuring the plurality of fuel cells into an electrical interconnection selected from the group consisting of series electrical interconnection, parallel electrical interconnection and mixed series and parallel electrical interconnection for output to at least one pair of output terminals.

104. A fuel cell battery (FCB) device comprising:

a plurality of fuel cells each comprising a cathode, an anode, and an ionically-conducting medium disposed therebetween, the cathode having at least one cathode element and a cathode terminating element electrically coupled thereto, and the anode having at least one anode element and anode terminating element electrically coupled thereto;

a connector block having a plurality of first and second engagement elements, corresponding to cathodes and anodes, respectively, of the plurality of fuel cells, that independently and releasably engage the corresponding cathode and anode to provide electrical connection to the cathode terminating element and anode terminating element of the corresponding cathode and anode;

end supports, coupled to ends of the connector block, that provides an open area beneath the connector block; and a support tray, wherein the cathode element of each fuel cell comprises an air cathode and the anode element comprises a metal-fuel, and wherein a spacing for air movement is provided between adjacent cells, and wherein the support tray, end supports, and open area beneath the connector block define an air duct for channeling air to the fuel cells.

105. The FCB device of claim 104, wherein at least one end support comprises air movement control means for providing and moving air into the air duct and out through the spacing between adjacent cells.

106. The FCB device of claim 105, wherein said air movement control means comprises at least one fan.

107. A fuel cell battery (FCB) device comprising:

a plurality of fuel cells each comprising a cathode, an anode, and an ionically-conducting medium disposed therebetween, the cathode having at least one cathode element and a cathode terminating element electrically coupled hereto, and the anode having at least one anode element and anode terminating element electrically coupled thereto;

a connector block having a plurality of first and second engagement elements, corresponding to cathodes and anodes, respectively, of the plurality of fuel cells, that independently and releasably engage the corresponding cathode and anode to provide electrical connection to the cathode terminating element and anode terminating element of the corresponding cathode and anode, wherein said connector block is elongated along a longitudinal axis, and each fuel cell extends from the longitudinal axis, wherein said connector block comprises at least two rows of engagement elements extending along said axis; wherein one of said rows of engagement elements comprises a set of first interconnecting elements in electrical connection to the cathode terminating elements for a set of fuel cells, and another of said rows of engagement elements comprises a set of second interconnecting elements in electrical connection to the anode terminating elements for the set of fuel cells, and wherein said connector block comprises at least two lateral stepped ledges, one of said ledges comprising one of said rows of engagement elements, and another of said ledges comprising the other of said rows of engagement elements.

108. A fuel cell battery (FCB) device comprising:

a plurality of fuel cells each comprising a cathode, an anode, and an ionically-conducting medium disposed therebetween, the cathode having at least one cathode element and a cathode terminating element electrically coupled thereto, and the anode having at least one anode element and anode, terminating element electrically coupled thereto;

a connector block having a plurality of first and second engagement elements, corresponding to cathodes and anodes, respectively, of the plurality of fuel cells, that independently and releasably engage the corresponding cathode and anode to provide electrical connection to the cathode terminating element and anode terminating element of the corresponding cathode and anode; and a support tray for supporting said plurality of fuel cells, wherein said tray and said fuel cells comprising co-fitting key elements to help maintain said fuel cells in a fixed position.

109. A fuel cell battery (FCB) device comprising:

a plurality of fuel cells each comprising a cathode, an anode, and an ionically-conducting medium disposed therebetween, the cathode having at least one cathode element and a cathode terminating element electrically coupled thereto, and the anode having at least one anode element and anode terminating element electrically coupled thereto;

a connector block having a plurality of first and second engagement elements corresponding to cathodes and anodes, respectively, of the plurality of fuel cells, that independently and releasably engage the corresponding cathode and anode to provide electrical connection to the cathode terminating element and anode terminating element of the corresponding cathode and anode, wherein said connector block is formed from a solid base of electrically insulating material.

110. The FCB device of claim 16, wherein each fuel cell comprise a metal fuel anode and air cathode.

111. The FCB device of claim 16, wherein each fuel cell comprises a hydrogen-based fuel cell.

112. The FCB device of claim 17, wherein each fuel cell comprises a metal fuel anode and air cathode.

113. The FCB device of claim 17, wherein each fuel cell comprises a hydrogen-based fuel cell.

114. The FCB device of claim 23, wherein each fuel cell comprises a metal fuel anode and air cathode.

115. The FCB device of claim 23, wherein each fuel cell comprises a hydrogen-based fuel cell.

116. The FCB device of claim 28, wherein each fuel cell comprises a metal fuel anode and air cathode.

117. The FCB device of claim 28, wherein each fuel cell comprises a hydrogen-based fuel cell.

118. The FCB device of claim 29, wherein each fuel cell comprises a metal fuel anode and air cathode.

119. The FCB device of claim 29, wherein each fuel cell comprises a hydrogen-based fuel cell.

* * * * *